(12) United States Patent
Mikkelson

(10) Patent No.: US 10,222,243 B2
(45) Date of Patent: Mar. 5, 2019

(54) DEVICES, SYSTEMS AND METHODS FOR SHIFTED DELTA SUM ANGLE MEASUREMENT

(71) Applicant: WISYS Technology Foundation, Inc., Madison, WI (US)

(72) Inventor: Dennis Mikkelson, Menomonie, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 71 days.

(21) Appl. No.: 15/231,289

(22) Filed: Aug. 8, 2016

(65) Prior Publication Data

US 2017/0038228 A1 Feb. 9, 2017

Related U.S. Application Data

(60) Provisional application No. 62/201,754, filed on Aug. 6, 2015.

(51) Int. Cl.
G01D 5/347 (2006.01)
G01D 3/036 (2006.01)

(52) U.S. Cl.
CPC ....... G01D 5/34707 (2013.01); G01D 3/0365 (2013.01); G01D 5/3473 (2013.01)

(58) Field of Classification Search
CPC .. G01D 5/34707; G01D 5/3473; F16C 25/083
See application file for complete search history.

(56) References Cited

U.S. PATENT DOCUMENTS

| 4,533,902 A | 8/1985 | Baker et al. |
| 2013/0147295 A1* | 6/2013 | Shimizu ................ H02K 7/083 310/90 |

OTHER PUBLICATIONS

S. Leleu et al.; La Mesure Des Angles AU BNM-LNE Creation D"une Nouvelle Reference De Mesure Angulaire; In 11e Congrès International de Métrologie, p. 7. Bureau National de Métrologie-Laboratoire National de Métrologie et d'Essais, pp. 1-7; 2003: Paris.
Pisani M. Astrua et al.; "Angle metrology at INRIM in the framework of the EMRP Project SIB58," In 17th International Congress of Metrology, 13013. EDP Sciences, pp. 1-5; 2015. Italy.
David G. Martin; "High precision angle calibration for spherical measurement systems.": Thesis; PhD diss., University of Warwick, pp. 1-278; 2009; US.

* cited by examiner

*Primary Examiner* — Thanh Luu
(74) *Attorney, Agent, or Firm* — Boyle Fredrickson S.C.

(57) ABSTRACT

Disclosed herein are systems and methods for angle measurement. According to one embodiment, the angle of rotation between a first movable portion of the device and a second fixed portion of the device is measured based on the times when a plurality of marks on a third rotating portion of the device are sensed by a plurality of sensors on both the first movable and the second fixed portions of the device. The embodiment utilizes an electronic computation device to analyze the times and provide an accurate measurement of the angle.

12 Claims, 20 Drawing Sheets

DEVICES, SYSTEMS AND METHODS FOR SHIFTED DELTA SUM ANGLE MEASUREMENT

CROSS REFERENCE TO RELATED APPLICATIONS

This application claims the benefit of U.S. provisional application 62/201,754 filed Aug. 6, 2015, and hereby incorporated by reference in its entirety.

TECHNICAL FIELD

This disclosure relates generally to devices that provide angle measurement and to related systems and methods.

BRIEF SUMMARY

Embodiments described herein include an angle measuring device comprising one or more rotating disks, each rotating disk comprising one or more locations indicated by one or more marks. The marks are sensed by one or more fixed sensors and one or more movable sensors, the fixed sensors and the movable sensors generating sensor outputs. A processor is configured to receive the sensor signals and to measure an angle of rotation between the one or more movable sensors and the one or more fixed sensors based on the sensor signals.

Embodiments described herein include a method for measuring an angle of rotation. One or more fixed sensors and one or more movable sensors sense one or more location marks on one or more rotating disks, the sensors generating sensor outputs in response to the sensing. The angle of rotation is measured using the sensor outputs.

BRIEF DESCRIPTION OF DRAWINGS

The figures are not necessarily to scale. Like numbers used in the figures refer to like components. However, it will be understood that the use of a number to refer to a component in a given FIG. is not intended to limit the component in another figure labeled with the same number.

DETAILED DESCRIPTION OF ILLUSTRATIVE EMBODIMENTS

Figure 1:
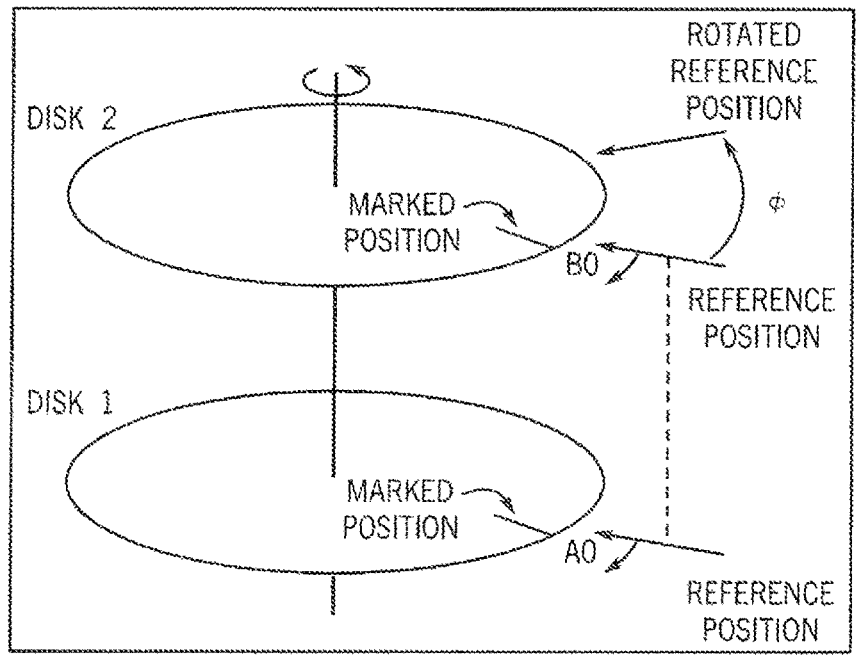
FIG. 1 is a conceptual diagram indicating the basic principle of operation in the simplified case of one mark on each of two rotating disks.

Devices to measure angles around a full circle with an accuracy of an arc-second or less are needed for various applications ranging from surveying to manufacturing inspection and metrology. Currently such devices are expensive and are typically based on very accurately calibrated disks together with sophisticated opto-electronics sensors and integrated or external data processing hardware and software that is used to correct and/or improve the resolution of the raw sensor data. With these systems the accuracy of a measurement generally depends on the accuracy of the disk in addition to the accuracy of the bearings supporting the disk and other mechanical components. These are limiting factors on the overall system accuracy along with problems associated with the various interpolation and averaging strategies employed when calculating the rotation angle based on the calibrations on the disk.

The current device implements a novel system for high accuracy angle measurement that has exceptionally high resolution and as high or higher accuracy than most conventional systems. This system, called the Shifted Delta Sum Angle Measurement System (SDSAMS) is a process by which angles can be measured with milli-arcsecond resolution and 0.1 arcsecond or better accuracy around the full circle using readily available, inexpensive, low accuracy encoders together with any one of several readily available compute devices. The accuracy is not limited to the accuracy of a calibrated disk.

To put this in perspective, since there are 360·3600=1,296,000 arcseconds in a complete circle, 0.1 arcsecond accuracy corresponds to somewhat better than one part per ten million accuracy. This corresponds to a movement of approximately 0.5 millionths of an inch at a radius of 1 inch. Resolution of a milli-arcsecond corresponds to a movement of ⅓ the unit cell size of a nickel crystal at a radius of 1 inch. Clearly, electro-mechanical measurements with this sensitivity require attention to detail. The sample implementation of the invention described achieves this performance level using inexpensive encoder disks with 2500 lines per revolution, which gives 10,000 pulses per revolution using quadrature decoding. Milli-arcsecond resolution corresponds to better than one part per billion resolution which is an improvement of more than five orders of magnitude beyond the resolution of the encoder disks.

There are several current approaches to high accuracy angle measurement.

Direct Reading of a Precision Calibrated Disk

The most commonly used methods for high accuracy angle measurement rely on precisely placed graduations marked on glass disks. For high accuracy, the graduated disk is typically mounted on a shaft that rotates in precision bearings. For the highest accuracy, air bearings are used.

To reduce reading errors due to errors in the positions of individual graduations, sensor heads of many different types have been used to evaluate the rotation angle by observing multiple graduations simultaneously. Such sensor heads may employ a small sector of a similar grating in front of the detector to generate a Moiré pattern that varies through one cycle of a generally sinusoidal function as the master grating rotates through an angle corresponding to one graduation spacing on the master disk. Alternatively a system may use very fine graduations with spacings on the order of a wavelength of light and generate and measure the movement of optically generated interference patterns as the disk rotates. Some sensor heads use CCD arrays to acquire and analyze images of segments of a master graduated disk.

To further reduce the effect of graduation errors, and to compensate for disk mounting and rotation errors, readings from multiple sensor heads are typically combined. In relatively simple cases, two diametrically placed sensor heads are used to correct a one cycle per revolution error due imperfect centering of the disk on the axis of rotation. In more elaborate cases, up to 16 sensor heads spaced strategically around the disk have been used to observe the graduations on a large graduated disk. The sensor heads are carefully placed to compensate for multiple higher order disk errors and to allow for the calculation of self-calibration curves.

Since even the highest resolution disks currently employed have graduations separated by multiple arcseconds, interpolation is employed to obtain higher resolution. This type of interpolation has been used to increase the resolution of the system by factors up to several thousand. This approach leads to a fairly complicated error function with both high and low frequency components. The low frequency components are largely due to disk mounting eccentricity and "skew", imperfect rotation of the disk due to bearing imperfections and any slowly varying errors in the disk graduations. The high frequency components are largely due to errors in the interpolation, bearing "noise" and any more rapidly varying errors in the disk graduations.

For the highest accuracy, a calibration process is often employed to characterize and attempt to correct for the main residual errors. This is quite successful for the low-frequency errors, but more difficult for the high frequency errors due to local variations in the disk graduations and in the interpolation results. While current computer capabilities would easily accommodate a calibration table with over a billion entries to provide a resolution on the order of milli-arcseconds, obtaining accurate calibration data of that resolution around the full circle for each individual device would be extremely difficult, time-consuming and expensive.

Phase Measurement Using Rotating Precision Disks and/or Encoders

A different approach to high accuracy angle measurement has been implemented successfully at several national laboratories. This approach uses two precision graduated disks rigidly mounted to rotate together on a common rotating shaft. Two sets of sensors are used, one set of sensors for each disk. The sensors for one of the disks are on a fixed base and the sensors for the second disk are on a platform that can also rotate about the same axis of rotation as the rotating disks. The signals from the two sets of sensors will be of the same frequency but will be shifted in phase. If the platform holding the sensors for the second disk is rotated slightly, the phase difference between the signals from the two sets of sensors will also change. In particular, if the platform is rotated though an angle corresponding to the angle between successive graduations on the disks, the phase difference will change by one complete cycle. This provides a high resolution measurement of the angle through which the rotating platform has been moved relative to the fixed base. The number of complete phase cycles provides a "coarse" reading of the angle with each complete cycle corresponding to a rotation by one division of the graduated disk. A "fine" reading is obtained by measuring the current phase difference between the signals. The angle of rotation is the sum of the "coarse" and "fine" angle readings.

The implementations of this approach at the national laboratories have used large very expensive custom hardware, In some of the cases cited, complete high end commercial encoders (Heidehain RON 905) costing around $20,000 each were used instead of custom precision graduated disks and sensors. According to the cited papers, the resulting systems achieved accuracies on the order 0.05 arc seconds, after correcting the raw values using a measured calibration curve.

Phase Measurement Using Rotating Non-Precision Disks

A previous patent, U.S. Pat. No. 4,533,902, claimed that a system with rotating disks (in some ways similar to the systems just described) can provide "arc-second" accuracy using "nonprecision" disks. The sample implementation described in that patent used two ordinary metal gears for the two graduated disks and magnetic sensors to detect the motion of the gear teeth, instead of a precision glass disk and optical sensors. Currently, the concepts described in that patent do not seem to be widely used.

Embodiments disclosed herein involve devices, systems and methods that provide accurate measurement of angles. The embodiments provide measurement resolution of approximately a milli-arcsecond (if multiple readings are averaged), which approaches the best currently possible resolution as obtained by national standards institutes. The embodiments also provide excellent single reading accuracy of approximately 100 milli-arcseconds around a full 360 degree circle, when calibrated.

Some embodiments could easily be adapted for use in various common devices ranging from surveyor's theodolites and astronomical telescope mounts to industrial inspection and machine tools. The major cost of the example implementation of the embodiments described herein is a high precision bearing to constrain the motion of a set of sensors to a precise circular path. Consequently, if integrated into the design of a mechanism such as a telescope mount, theodolite or machine tool that already has high precision bearings, the embodiments disclosed herein could provide high resolution, high accuracy angle measurement capability for a relatively small additional cost.

The embodiments disclosed herein form a novel system for angle measurement called the Shifted Delta Sum Angle Measurement System (SDSAMS). The SDSAMS uses one or more rotating marked disks rigidly mounted to rotate together on a common rotating shaft. Two sets of one or more sensors are used, one set on a fixed base and a second set that moves through the angle to be measured. The movable sensors rotate about the same axis as the rotating disks. The measured angle is calculated based on the times when marks on the rotating disk(s) are sensed by the set of movable sensors compared to the times when marks are sensed by the set of fixed sensors.

A starting point for understanding the SDSAMS is the simplified conceptual diagram in FIG. 1. Suppose that we have two circular disks rigidly attached to a common vertical axis and that there is a unique position marked on each disk as shown. Suppose further that there is a reference position for each disk, and that the reference position for the second disk can be rotated about the common axis of the disks. The angle to be measured is the angle $\phi$ through which the reference position for the second disk is rotated from a position where the two reference positions are perfectly aligned with the reference position for the second disk directly above the reference position for the first disk. The positive direction for measuring the angle $\phi$ is when viewed counter-clockwise from above.

In some embodiments it is convenient to use two disks in an implementation so that the sensors implementing the reference positions can be moved independently all the way around the disks without interference. In the example implementation the disks are simple incremental optical encoder disks and the reference positions are implemented by the encoder sensor modules. The same concept could apply to division marks on two sides of one disk as long as the sensors could be moved around the full circle if necessary. The one disk configuration could also be implemented with a reflective optical disk and optical sensors, or with a magnetic disk and read heads similar to those used in computer disk drives.

Suppose now that $A_0$ and $B_0$ are the angles between the aligned reference positions and the marks on the disks. The positive direction for measuring angles from the reference positions to marks on the disks is taken to be clockwise when viewed from above. While the marks on the disk may be roughly aligned so that $A_0$ and $B_0$ are nearly equal, the relative positions of the marks is actually not important, as long as the relative positions stay fixed. In particular, as will be described below, we can measure the difference $$\sigma = B_0 + \phi - A_0$$

and from this difference we can find the angle $\phi$ as $$\phi = \sigma - (B_0 - A_0)$$

In this equation, $\sigma$ is the quantity that we actually measure, and $\phi$ is the angle we wish to measure. In practice, using equation (2), we are actually measuring the angle $\phi$ relative to a fixed offset $(B_0 - A_0)$. This fixed offset is independent of the common reference positions, since any change in the common reference positions would change both $A_0$ and $B_0$ equally, and the changes would cancel in the difference. This offset is not a problem in practice and we don't even need to know the actual value of the offset. In practice, we can set the device to the position we want to be the zero position and record the $\phi$ value from equation (2) at that position. That recorded value can then be subtracted from subsequent measurements of $\phi$.

The key to measuring the sum a is to spin the disks about their common axis at a constant angular velocity, in a counter-clockwise direction, as indicated in FIG. 1. If this is done, the problem of measuring angles is replaced by the problem of measuring times, which can be done very accurately. Suppose that we set t=0 when the disks are in the position shown relative to the aligned reference positions. Suppose further that $\alpha_0$ is the time when the mark on the first disk passes by the common reference position and that $\beta_0$ is the time when the mark on the second disk passes by the common reference position. If T is the time for one complete revolution then the angle $A_0 = (\alpha_0/T) \cdot 360°$ and $B_0 = (\beta_0/T) \cdot 360°$. Similarly if $\tau_0$ is the time when the mark on the second disk passes the rotated reference position, then $B_0 + \phi = (\tau_0/T) \cdot 360°$. Consequently, by measuring the times $\alpha_0$ and $\tau_0$ we can measure the sum $\sigma$ as $$\sigma = \frac{\tau_0 - \alpha_0}{T} \cdot 360° \tag{3}$$

If the angles are measured in this way, the choice of when to start the timer is arbitrary, since any offset to the start time just leads to equal offsets to $\alpha_0$ and $\tau_0$ which will cancel in the difference.

Now, consider the idealized situation where the disks rotate with a precisely constant angular velocity around a perfect axis, the upper movable reference point sweeps out the angle $\phi$ by moving precisely around a perfect circle that is exactly centered on and perpendicular to the axis of the rotating disks and where the times when the marks pass the reference points can be measured with perfect accuracy. In such an idealized situation, $\phi$ would be measured exactly by the process just described and this measurement would be independent of the value of the angles $A_0$ and $B_0$. In mathematical terms, the angles $A_0$ and $B_0$ can be arbitrary, but fixed. The simplified system just described, would produce exact measurements of the angle if we could 1) rotate the disks at a precisely constant angular velocity around a perfect axis, 2) rotate a sensor around a perfectly circular path with the same axis as the axis of rotation of the disks and 3) accurately measure the times when marks pass sensors. In an actual implementation none of these things can be done exactly, however, as will be shown, some modifications to the simplified process described can easily improve the results by several orders of magnitude, and with careful attention to the centering of the disks and sensor axes, most systematic errors can be significantly reduced. The contributions of various possible deviations from the ideal situation to the overall error in the measurement of $\phi$ will be discussed later.

The first and simplest implementation improvement is to use more than one mark per disk. For example, if readily available encoder disks with 2,500 lines are used with quadrature decoding, there will effectively be 10,000 distinct mark positions nearly evenly spaced around each disk and we can make 10,000 measurements by the above process in a revolution or two. In this case the resolution of the measurement would be improved by a factor of 10,000. Assuming the errors in the measurements are normally distributed, the standard deviation of the measurement would reduce by a factor of 100. To say this differently, by measuring the angle from the reference position to 10,000 marks on the disk, changing the reference position by angle $\phi$ changes the sum of those angles by 10,000$\phi$. This effectively increases the sensitivity of the measurement by a factor of 10,000.

Figure 2:
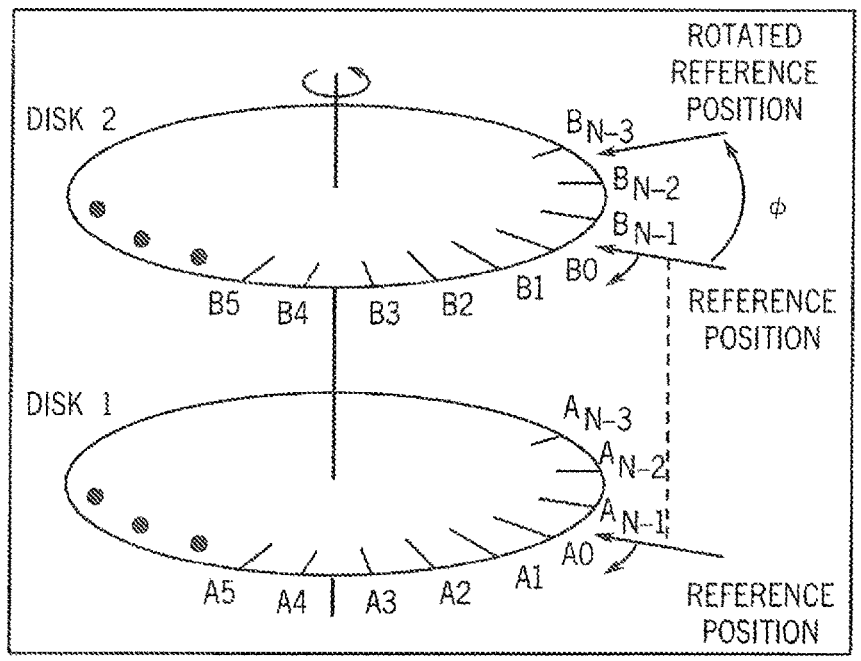
FIG. 2 is a conceptual diagram indicating the basic principle of operation in the general case of N marks on each of two rotating disks.

The general case with N positions marked around each disk is shown in FIG. 2. In this case, we would form the sum of angles $$S_0(\phi) = \sum_{i=0}^{N-1} [(B_i + \phi) - A_i] \quad (4)$$

As before, assuming the disks rotate at constant angular velocity, this could be actually be measured using times as $$S_0(\phi) = \frac{\sum_{i=0}^{N-1} (\tau_i - \alpha_i)}{T} \cdot 360°$$

where $\alpha_i$ is the time when the mark at angle $A_i$ passes the reference point and $\tau_i$ is the time when the mark at angle $B_i$ passes the reference point that is rotated by angle $\phi$.

Since $$S_0(\phi) = \sum_{i=0}^{N-1} (B_i - A_i) + N\phi$$
$$= S_0(0) + N\phi$$

the equation can be solved for $\phi$ to get $$\phi = \frac{S_0(\phi)}{N} - \frac{S_0(0)}{N}$$

As in equation (2), this equation splits into two parts. The first part can be measured using times and equation (5). The second part $S_0(0)/N$ is a constant offset that only depends on the relative positions of the angles $\{A_i\}$ and $\{B_i\}$. Neither these angles nor the sum $S_0(0)$ need to be known, since as mentioned earlier, we can measure $\phi$ at some location we designate as the zero angle position and subsequently subtract that measurement from angles measured using equation (8).

In some scenarios, if $\phi$ is large, it may take nearly a full revolution after $A_0$ passes the reference position before $B_0$ passes the shifted reference position. It would then take essentially another full revolution for all of the remaining $B_i$ to pass the shifted reference position. Overall, it would take nearly two complete revolutions to measure all of the terms in the sum $S_0(\phi)$. In this case, the angles $\{A_i\}$ would be largely measured during the first revolution and the angles $\{B_i\}$ would be largely measured during the second revolution. Since in practice, the disk angular velocity will not be perfectly constant this would introduce significant errors in the measurement.

We can avoid this problem if we measure the "B" times during the same revolution as we measure the "A" times. That is, if we start recording times with the disks rotating from the position shown, in FIG. 2, the first "A" to be measured would be $A_0$ and the first "B" measured would be $B_{N-2}$. Continuing around the circle we could measure the sum $$S_2(\phi) = \sum_{i=0}^{N-1} [(B_{i-2} + \phi) - A_i] \quad (9)$$

where the shift of the subscript is calculated mod(N). As will be shown, the shift of the subscript on $B_i$ can be handled easily.

We call the general form of this sum the "Shifted Delta Sum" (SDS).

$$S_k(\phi) = \sum_{i=0}^{N-1} [(B_{i-k} + \phi) - A_i] \quad (10)$$

In this sum, $\{A_i\}$ and $\{B_i\}$ are two sets of N fixed angles satisfying: $0° \leq A_0 < A_1 < \ldots < A_{N-1} < 360°$ and $0° \leq B_0 < B_1 < \ldots < B_{N-1} < 360°$. The angle $\phi$ is the angle that is to be measured. Note that there are actually two shifts in this sum. The subscript on the angles $B_i$ are shifted by k, where the subtraction i−k is done mod(N). Also, the angles in $\{B_i\}$ are shifted by $\phi$.

The exact values of the angles $\{A_i\}$ and $\{B_i\}$ are not theoretically important, and as before these angles do not even need to be known, but just need to have fixed values. In practice, it is both convenient and helpful for error analysis, to have the same number of angles in each set and to have the angles at least nearly evenly spaced around the circle, as is the case with the angles of the division points on an inexpensive encoder disk. This sum is important since an electro-mechanical system can be constructed to essentially measure this sum, and the $\phi$ angle can be calculated using this sum.

In order to see how the SDSAMS works, the following interesting property of the SDS evaluated at $\phi=0$ can be used. Specifically, we will show that for any k, $S_k(0)$ is related to $S_0(0)$ by subtracting $k \cdot 360°$. That is, $$S_k(0) = -k \cdot 360° + S_0(0) \tag{11}$$

This is most easily proven by mathematical induction. First, if k=0 this equation is trivially correct. Suppose now that the equation holds for k=m. Then if k=m+1 we have:

$$S_{m+1}(0) = \sum_{i=0}^{N-1}(B_{i-(m+1)} - A_i)$$

$$= \sum_{i=0}^{N-1}(B_{i-(m-1)} - B_{i-m} + B_{i-m} - A_i)$$

$$= \sum_{i=0}^{N-1}(B_{i-(m+1)} - B_{i-m}) + \sum_{i=0}^{N-1}(B_{i-m} - A_i)$$

$$= -\sum_{i=0}^{N-1}(B_{i-m} - B_{i-m-1}) + S_m(0)$$

$$= -360° + S_m(0)$$

$$= -360° - m \cdot 360° + S_0(0)$$

$$= -(m+1) \cdot 360° + S_0(0)$$

Since $0' < B_0 < B_1 < \ldots < B_{N-1} < 360°$ the summation in the fourth line above is the complete sum of all of the differences of adjacent angles around the full circle, so it is precisely 360°.
Using this, we see that:

$$S_k(\phi) = \sum_{i=0}^{N-1}[(B_{i-k} + \phi) - A_i] \tag{19}$$

$$= \sum_{i=0}^{N-1}(B_{i-k} - A_i) + \sum_{i=0}^{N-1}\phi \tag{20}$$

$$= S_k(0) + N\phi \tag{21}$$

$$= -k \cdot 360° + S_0(0) + N\phi \tag{22}$$

Solving this equation for $\phi$, we get:

$$\phi = \frac{S_k(\phi)}{N} + \frac{k}{N} \cdot 360° - \frac{S_0(0)}{N}$$

It is worth noting that this equation holds for any choice of k. If k=0, we have the case discussed previously and $S_k(\phi)$ can be measured using times when marks pass sensors, as shown in equation (5). In the general case we just measure $S_k(\phi)$ using times as;

$$S_k(\phi) = \frac{\sum_{i=0}^{N-1}(\tau_{i-k} - \alpha_i)}{T} \cdot 360° \tag{23}$$

We can use any value of k that is convenient, and in the idealized case, any k would work equally well (actually perfectly). In a real system, it is helpful to choose k so that we start measuring both the A values and the shifted B values as soon as possible after starting the timer. Also we can start the timer at any convenient time, since any shift in the time when t=0 will affect both the $\alpha$ and $\tau$ values equally, and will cancel in the difference.

Since we know N and can directly measure $S_k(\phi)$, the first term on the right side of equation (23) can be measured. In practice values of N in the range of 1,000 to 10,000 or larger are easily used, and $S_k(\phi)$ can be measured with high resolution and accuracy. Therefore the first term can be evaluated with very high resolution and accuracy. Since k and N are integers that are known or measured exactly, the second term does not introduce any error in the measurement of $\phi$. As in the simpler form discussed earlier, the last term $S_0(0)/N$ is a fixed constant that is independent of $\phi$ and k. Consequently, overall, this calculation forms the basis for a very high resolution and highly accurate system for measuring angles.

To obtain the value of k in equation (23), we will identify the specific angles $A_0$ and $B_0$ on the disks. The actual terms of the SDS that are measured for one complete revolution of the disks, starting at an arbitrary starting time, will include all of the angles $\{B_{i-k}+\phi\}$ and $\{A_i\}$ in sequence, mod(N), but they will generally not start with the zeroth entry in either of these lists. If common optical encoders that have an index mark are used, the index mark can be used to identify the zeroth angle. If an implementation uses a different sensing method, such as magnetic marks on a disk surface, an additional track could be used to provide an index mark for each disk surface. In any case, if we define $A_0$ to be the angle of the first mark following the index mark on the first disk, and define $B_0$ similarly on the second disk, we can determine the shift k by noting the position of $A_0$ and $B_0$ in the sequence of measured angles. The difference of the position numbers for $B_0$ and $A_0$, mod(N), in the sequences of measured angles, is k.

As an example, consider the configuration in FIG. 2. Suppose that the disks rotate in the direction indicated and that time is measured starting at the moment shown in the diagram. Assume further that the reference position for disk 2 is rotated through the angle $\phi$ as shown. In that case the A angles would be measured in the order $A_0, A_1, A_2 \ldots$ and the shifted B angles would be measured in the order $B_{N-2}+\phi$, $B_{N-1}+\phi, B_0+\phi, B_1+\phi \ldots$ As a result, $A_0$ would be in position 0 in the sequence of A measurements and $B_0+\phi$ would be in position 2 of the B measurements, so k=2.

Two example implementations of these principles were built to verify and demonstrate the ideas just described. The main structural components of the example implementations are machined out of alloy 7075 aircraft aluminum. The structural components have thick cross-sections to provide for mechanical strength and stability, good thermal conductivity and a long thermal time constant. Temperature variations are a major limiting factor for any high accuracy measurement. Where possible, the structural components are symmetric about the axis of rotation of the disks, to minimize angular changes due to changes in the ambient temperature.

The bearings, slip ring, optical encoders, and electronics used in the example implementations are readily available industrial quality components. It is likely that the performance could be improved further by using special higher precision bearings, higher quality optical encoders, and motor and by making further refinements to the materials and overall design for thermal management.

Detailed design and test results for the first sample implementation are described first.

Figure 3:
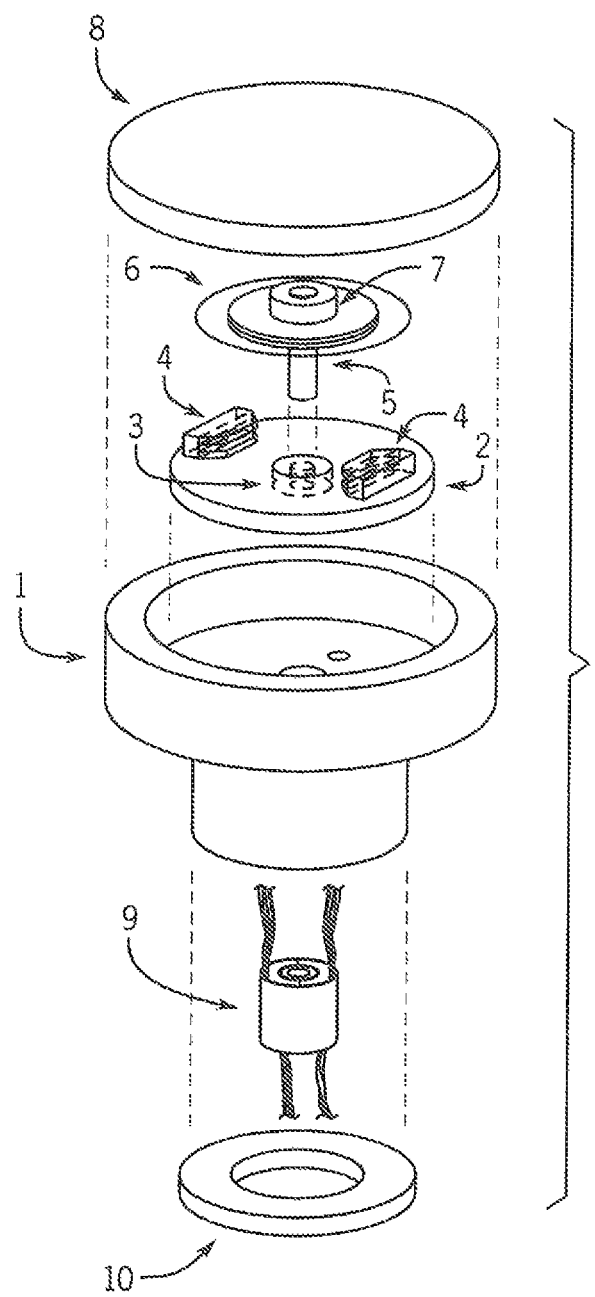
FIG. 3 is an exploded view of the rotating platform assembly for one possible implementation of the embodiments disclosed herein.

An exploded view of the rotating platform for the first example implementation is shown in FIG. 3. The rotating platform carries the movable reference point for the upper disk in the conceptual diagrams. The parts shown in FIG. 3 (other than the rotating disk assembly, 5, 6, and 7) rotate to change the measured angle, $\phi$. The lower portion of the main rotor, 1, is fitted into a pair of preloaded angular contact spindle bearings, 12, shown in FIG. 4. The upper part of the main rotor is hollowed out to contain the upper encoder disk, 6, and encoder sensor modules. 4. Upper cover plate, 8, fastens to the top of the main rotor to enclose the upper encoder components. The upper cover plate also provides a convenient mounting surface for a mirror, polygon, telescope, tangent arm, or whatever device will be rotated to change the measured angle, $\phi$.

The upper encoder mounting plate, 2, carries the encoder modules, 4, for the upper rotating disk. This plate also carries the upper bearing, 3, for the shaft, 5, that carries the rotating encoder disks. In the first example implementation there are two encoder modules, as shown. In other scenarios, there may be three, four, or more sensors mounted around the rotating disk on the upper encoder mounting plate. The upper encoder mounting plate is fastened rigidly to the main rotor, after being adjusted so that the axis of rotation of the shaft, 5, is precisely centered on the axis of rotation of the main rotor.

The rotating disks' shaft, 5, is a precision 303 stainless steel shaft that extends from the upper encoder disk down through the upper encoder mounting plate, slip ring, driving motor, lower encoder mounting plate and lower disk ending in the collar 18 that holds the thrust bearing 19. The shaft is only partially shown as two separate short shafts in the Figures, for illustration purposes. It is actually one continuous shaft. The shaft bearings, 3, for the rotating disks' shaft, are double shielded ABEC-7 deep groove ball bearings. The shaft has a small collar (not shown) that is fitted on the shaft below the encoder mounting plate. A small coil spring (also not shown) is fitted around the shaft between this collar and the bottom of the inner race of the upper shaft bearing, 3. This spring provides a light preload to the bearing by gently pushing the inner race upward to remove any looseness in the bearing.

The encoder modules and disks are from US Digital with 2500 lines per revolution, giving 10,000 virtual marks per revolution, in quadrature. The bare Mylar encoder disks, 6, are carefully centered and epoxied in place on oversized machined aluminum hubs, 7.

The slip ring assembly, 9, carries the power, index and channel A, B signals for all of the encoders mounted on the upper encoder mounting plate. The slip ring is fitted into a hollowed out section of the lower cylinder of the main rotor. The wiring from the top of the slip ring passes through two off-center holes in the main rotor and through slots in the bottom of the upper encoder mounting plate to the edge of the plate and then to the encoder modules. That wiring is not shown. The slip ring has a hollow center through which the shaft, 5, passes. Since the wiring from the upper rotating plate passes through the slip ring, the rotating platform assembly can rotate freely through as many complete revolutions as may be required.

Lower clamp ring 10, is a machined disk of 7075 aluminum that serves two purposes. First, it extends radially beyond the edge of the main rotor's lower cylinder and is held against the bottom of the inner race of the main rotor bearings 12, by screws threaded into the bottom of the main rotor. The main rotor bearings are angular contact bearings mounted "back-to-back", so this clamping action provides the preload force that brings the inner races together. Second, the lower clamp ring also holds the slip ring assembly in place in the main rotor.

Figure 4:
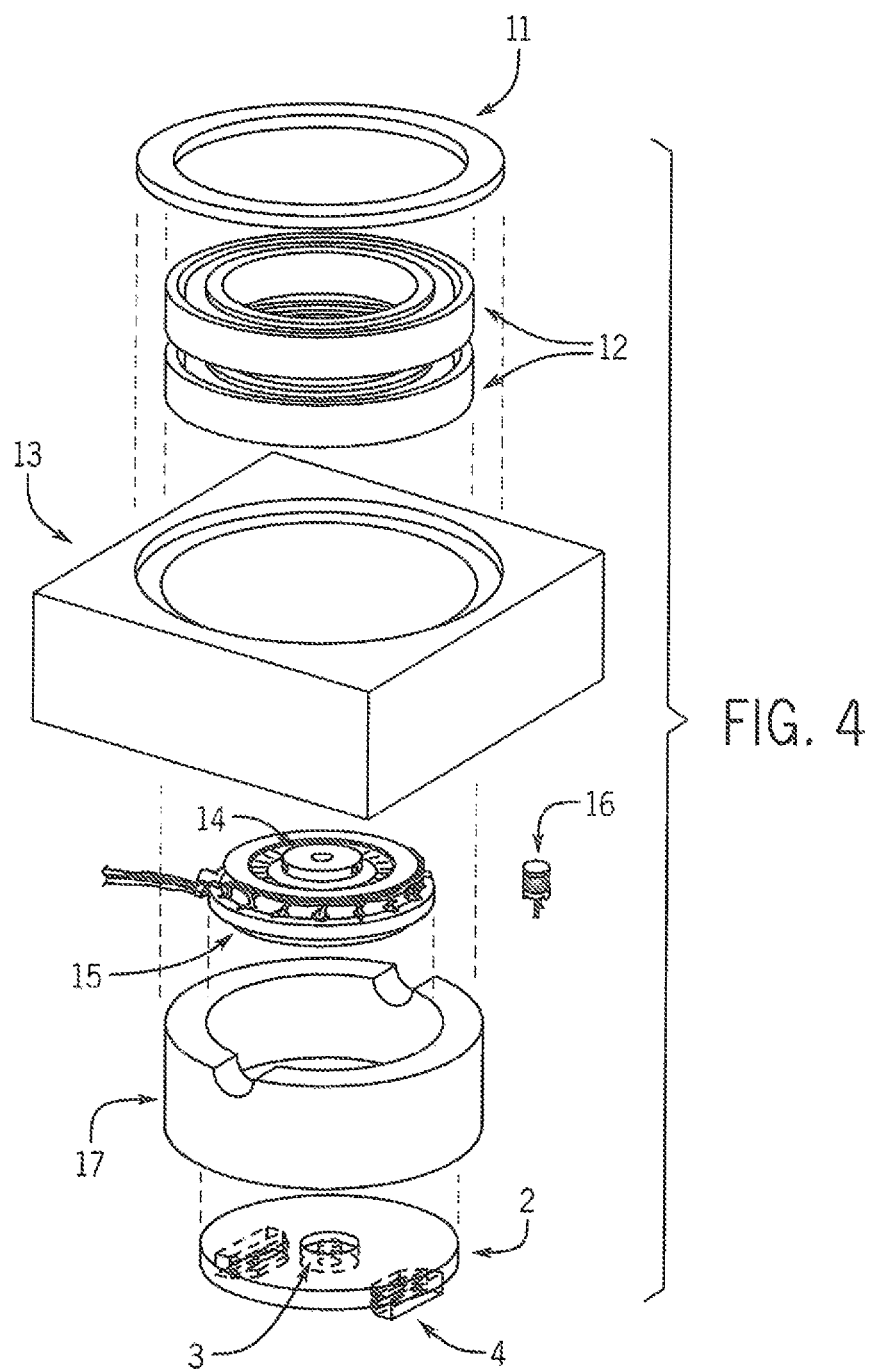
FIG. 4 is an exploded view of the main bearing and lower encoder assembly for one possible implementation of the embodiments disclosed herein.

The main non-rotating portion of the device is shown in FIG. 4. The spindle bearings, 12, are fitted into the main bearing housing, 13, and clamped in place by the upper clamp ring, 11. The upper clamp ring is fastened in place in the groove on the top of the main bearing housing.

The drive motor is a custom designed efficient, low power, frameless brushless three phase motor consisting of rotor, 14, and stator 15. In the first example implementation, the rotor is fabricated from a machined aluminum hub with twenty-four 3/16" cube neodymium magnets epoxied around the rim in a Halbach array with six north-south pole pairs. Arranging the rotor magnets in a Halbach array produces relatively strong concentrated magnetic poles. The rotor is fastened to the rotating disks' shaft, 5. In the first example implementation, the stator consists of eighteen small ferrite core inductors, 16, epoxied in place in holes in a machined Delrin ring. The coils are wired in a three phase "wye" configuration. Initial testing showed that this structure with neodymium magnets and ferrite core coils provides enough torque for this application and consumes less power than a conventional frameless brushless motor with laminated steel cores. The number of magnetic pole pairs on the motor rotor and corresponding number of coils in the motor stator affect the harmonic content of the motor's angular velocity error function. The number of magnetic pole pairs can be chosen to reduce the residual measurement error for a particular number of encoder sensor modules.

The motor is driven by a three phase sensorless brushless DC motor driver, DRV11873 from Texas Instruments. While the DRV11873 integrated circuit does change the currents supplied to the coils based on phasing information derived from voltages across the coils, the motor is essentially driven "open loop" without fine position or velocity feedback from an encoder. Early testing with other motor and driver combinations that included closed loop speed control demonstrated much worse performance, with much larger variation in the angle measurement on successive revolutions of disks when the system was run "closed loop". The larger variation in measured angle values when using "closed loop" speed control is most likely due to the servo system making frequent adjustments to the rotation rate as the motor rotates.

The stator is fastened in the hollowed out portion of the lower frame cylinder, 17. The motor leads and wires from the slip ring assembly are routed through the two notches shown in the top of the lower frame cylinder. The lower frame cylinder is bolted to the bottom of the main bearing housing, 13.

The lower encoder mounting plate (numbered 2 in Fig, 4) is essentially identical to the upper encoder mounting plate from FIG. 2, In the first example implementation, the lower mounting plate carries two encoder modules for the lower rotating disk and also carries the lower bearing, 3, for the rotating disks' shaft. In other scenarios, there may be three, four or more sensors mounted around the rotating disk on the lower encoder mounting plate. The lower encoder mounting plate is fastened rigidly to the bottom of the lower frame cylinder, after being adjusted so that the axis of rotation of the shaft, 5, is precisely aligned with the axis of rotation of the main rotor. The shaft, 5, also has a small collar (not shown) that is fitted on the shaft above the lower encoder mounting plate, A small coil spring (also not shown) is fitted around the shaft between this collar and the top of the inner race of the lower shaft bearing, 3, to provide a light preload to the bearing.

The adjustment of the positions of the two encoder mounting plates are relatively straight forward. Specifically, the position of the upper encoder plate was adjusted first by checking the centering of the shaft, 5, with a mechanical dial indicator while the main rotor was rotated through 360°. The screws that hold the upper encoder plate in place were gradually tightened while the centering of the shaft was checked. In this way the upper bearing was centered within about 0.0001" which is the amount of runout in the bearings. After the upper mounting plate was properly centered, the position of the lower mounting plate was adjusted while gradually tightening its mounting screws. This adjustment was made to eliminate any significant "tilt" of shaft 5 relative to the axis of rotation of the main rotor. This adjustment was done using an autocollimator to simultaneously view the images reflected by a mirror temporarily fixed to the top of the main rotor and a second mirror temporarily fixed to the end of shaft 5. The mirror on the main rotor was set so its surface was perpendicular to the axis of rotation of the main rotor. The mirror on shaft 5 was set so that its surface was perpendicular to the axis of rotation of shaft 5. The autocollimator measured the angular offset of the two axes based on the difference in the positions of the reflected images. In this way, the lower bearing was adjusted so that the tilt between the two axes was less than about 10 arc-seconds.

Figure 5:
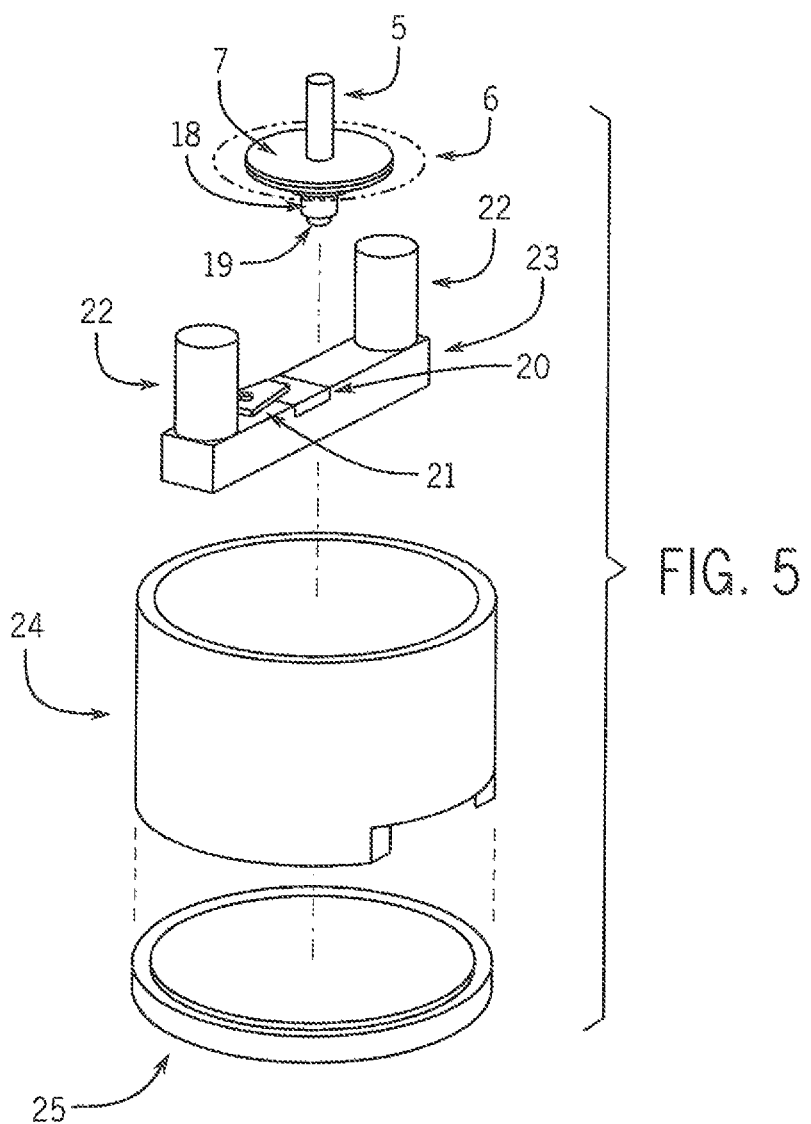
FIG. 5 is an exploded view of the lower thrust bearing and bottom cover for one possible implementation of the embodiments disclosed herein.

FIG. 5 shows the lower encoder disk, thrust bearing assembly and lower covers. The thrust bearing consists of a precision silicon nitride ball, 19, centered on the end of shaft 5, held in position by retaining collar 18. The bearing ball has the same diameter as shaft 5. The bore through collar 18 was reamed to produce an interference fit with the shaft 5 and the bearing ball. The interference fit provided a simple way to both fasten the ball to the end of the shaft and also to insure that the ball was accurately centered on the axis of the shaft.

The thrust plate 20, is fitted into a slot machined in the bottom bearing bar, 23 and held in place with a small clamp 21. The bearing bar is bolted to the bottom of the lower frame cylinder, 17, through two stainless steel standoffs, 22. The bottom of the slot in the bearing bar was machined with three slightly raised spots, one of which is centered on the axis of the rotating shaft. The three raised spots guarantee that the thrust plate will settle in a stable position in the slot. In the first example implementation, the thrust plate is a flat ½" square ⅛" thick titanium nitride coated carbide tooling insert. The carbide insert is readily available, inexpensive and extremely hard. If excessive wear occurs, both the silicon nitride ball and the carbide thrust plate are easily replaceable. In fact, different portions of the same carbide insert can be used for the thrust bearing by rotating the insert by 90° or by shifting the insert laterally in the slot.

A slight axial preload was applied to the thrust bearing by removing the thrust plate and adjusting the position of the motor armature on the shaft. The position was set so that the armature was at a stable "neutral" position in the center of the stator when the thrust bearing ball ended at a point that would be slightly (0.02") below the surface of the thrust plate. The axial component of the magnetic force attracting the armature to the stator coil cores provides the slight preload when the thrust plate is replaced in the slot.

Although there is only a light preload on the thrust bearing, since there is a point contact between a perfect sphere and a perfect plane, the force per unit area at the point of contact between the bearing ball and the thrust plate would be infinite. Therefore, the surface of the bearing ball and/or the surface of the thrust plate will have to deform or wear to provide a larger contact surface. The combination of a silicon nitride ball with a TiN coated carbide thrust plate has worked quite well. A microscopic donut shaped wear pattern developed after approximately a month of continuous running, but there was no degradation in performance of the system during six months of continuous running. Other combinations of materials may also work well.

The lower encoder disk assembly (parts 5, 6, 7), thrust bearing components (parts 18, 19, 20, 21, 22, 23) and lower frame cylinder assembly (parts 14, 15, 17) are enclosed in the lower cover cylinder 24. The slot in the side of the lower cover cylinder holds a standard DB-25 connector that carries all of the power and signal lines to the electronics package where the data from the encoder modules is processed. The lower cover plate, 25, attaches to the bottom of the lower cover cylinder to close off the mechanism.

Figure 6:
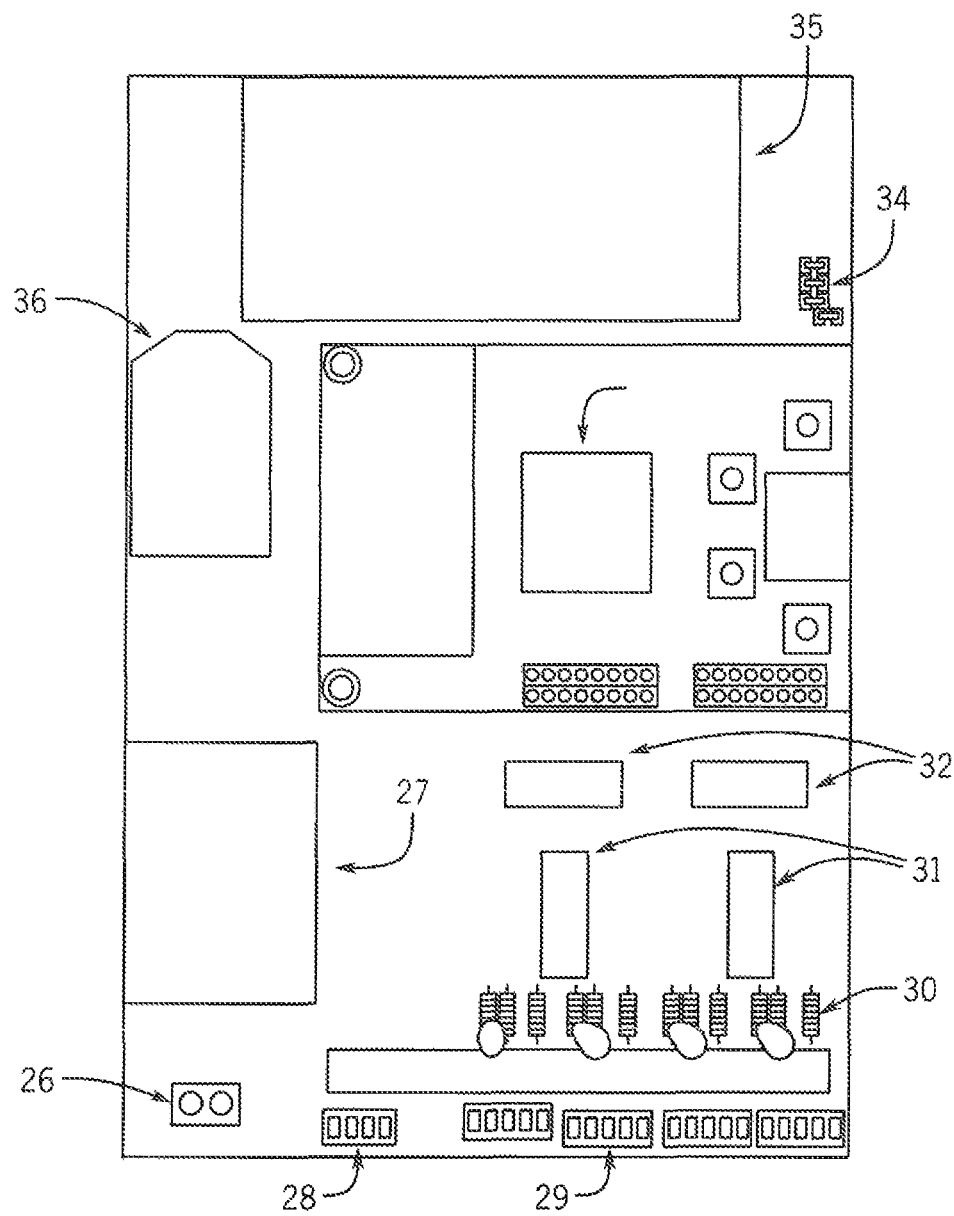
FIG. 6 is an image of a signal conditioning and computation unit for one possible implementation of the embodiments disclosed herein.
Figure 7:
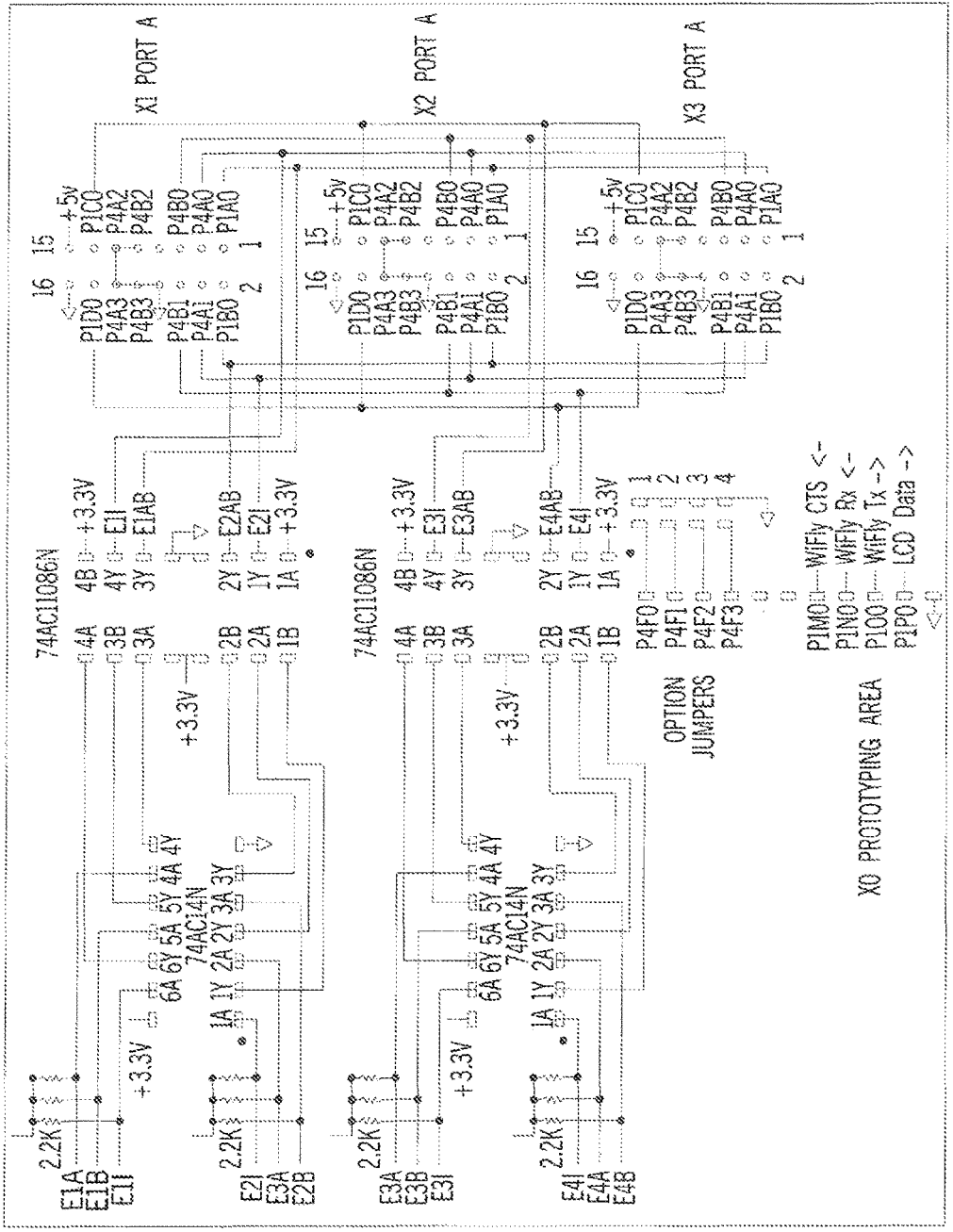
FIG. 7 is a wiring diagram for a signal conditioning and microprocessor development board interface for one possible implementation of the embodiments disclosed herein.

FIG. 6 is an image of the electronics package for the first example implementation and FIG. 7 shows the wiring diagram for the circuitry connecting the encoders to the microprocessor board. The power input connector, 26, gets power from a simple wall mounted 5 VDC power adapter. The 5 VDC directly powers the microprocessor and motor controller subsystems. There are separate 3.3 volt linear regulators for supplying power to the encoders, signal conditioning circuits, WiFi module and display subsystems. The DRV11873EVM motor driver board, 27, is on the lower left with its output wired to connector 28. The inputs for the four encoder modules, 29, are connected to some basic signal conditioning circuitry. The channel A, B and index data lines from the encoder modules are terminated with pull up resistors. 30, to improve the signal rise times. The data lines first go to two 74AC14N hex input Schmidt trigger inverters, 31, to provide some noise immunity and to reduce the signal rise time for properly driving the subsequent logic circuits. The outputs of the Schmidt triggers go to two 74AC11086N quadruple two-input XOR gates, 32. For each encoder, the Schmidt trigger outputs carrying the A, B signals go the two inputs of one XOR gate. The output of the XOR gate will have one signal transition for each signal transition on either of the A or B channels. This reduces the number of separate bits of data that are connected to and handled in the microprocessor. The output of the Schmidt trigger that corresponds to the index channel goes to one input of an XOR gate, with the second input tied high. This gate functions as an inverter which cancels the inversion of the index pulse in the Schmidt trigger and also makes the signal path for the index pulse identical to the signal path for the A, B signals, to reduce any signal skewing that might occur between the A XOR B signal and the index signal.

In the first example implementation, the computations are performed on an XMOS XC-1A microprocessor development board. The processor, 33, on this board has four physical cores (now called tiles by XMOS) each of which can run 8 independent threads (now called virtual cores by XMOS) with precise real-time timing capabilities. The conditioned data lines from all encoders are wired to input pins on three of the cores, in parallel, in an identical manner.

Thus, each of these three cores monitors the same stream of data from the encoders and does a complete calculation of the angle, based on data from complete revolutions of the disks. Each of these three cores accumulates the times when the marks pass the encoders and evaluates the Shifted Delta Sum, equation 24, and essentially evaluates the angle using equation 23. However, the data used and the calculations on the three cores are not started simultaneously. Specifically, the second core starts analyzing data ⅓ of a revolution after the first core, and the third core starts analyzing data ⅔ of a revolution after the first core. In this way the data rate is tripled, though the latency of any one calculated result is not reduced. The measurements from each of the three analysis cores are sent to the fourth core, which both streams all of the individual measurements to the WiFi module, 36, and forms averages of small groups of measurements for display at a lower, human readable rate, on the LCD display module, 35. Options, such as the number of marks on the disks and diagnostic modes, are set on jumper block 34 or using the four pushbuttons on the XC-1A development board.

In other scenarios, different types of signal conditioning and computation units may be employed, including but not limited to different microprocessors, field programmable gate arrays and digital signal processors.

Figure 8:
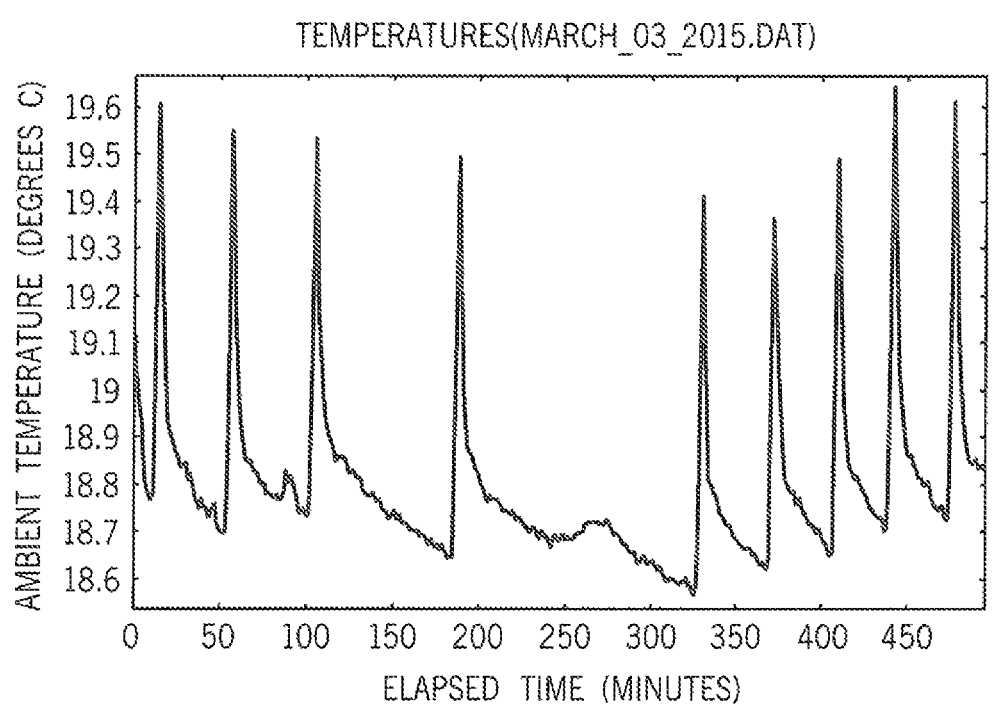
FIG. 8 shows typical ambient room temperature variations during the testing of one possible implementation of the embodiments disclosed herein.

The first example implementation was tested in several ways to verify its stability, sensitivity and accuracy. All tests were carried out in an ordinary indoor environment that was not temperature controlled by any means other than the ordinary building heating system. Consequently, there were temperature swings of slightly more than 1° Celsius when the heating system ran. These temperature variations occurred with time intervals ranging from about 15 minutes to several hours depending on outdoor temperatures. FIG. 8 shows a graph of the ambient temperature over a representative eight hour period.

Since very small angular changes can be detected by the device, some of the errors observed in the tests were certainly due to thermal effects in the measurement setup as well as in the device itself. It is important to note that the excellent performance of the device described in the following sections was obtained even with these changes in the ambient temperature. The device itself has a thermal drift of approximately 0.7 arc-seconds per degree Celsius for small long-term average temperature changes of a few degrees Celsius around room temperature. Since the device is made with relatively large thick section aluminum structures, the thermal time constant is fairly long. Extensive tests of the device over wide temperature ranges have not yet been performed.

The individual angular measurements produced by the device vary slightly with each revolution of the spinning disks, even when the rotating platform carrying the movable encoders is not moved. These variations appear to be due both to errors in the shaft support bearings and to variations in the angular velocity of the rotating disks.

The errors in the rotation of the spinning disks due to bearing errors have at least the following sources. First, neither the inner or outer races are perfectly circular. Second, the size of the individual bearing balls varies slightly from ball to ball. Third, the bearing balls are not perfect spheres. Fourth, there will be microscopic dirt particles that will come between the bearing balls and bearing races at random times as the shaft rotates. The effects of these factors are not easy to isolate and can never be fully eliminated in any actual physical bearing. We assume that the combined effect of all of these errors is of the same order of magnitude as the specified radial runout of the bearings. For the bearings used in the example implementations, the runout is specified as 0.0001 of an inch.

Very small errors can have a significant effect on high accuracy measurements. In particular a shift of 0.0001 of an inch in the position of the shaft would correspond to an angular change of roughly 20 arcseconds at the edge of a 2 inch in diameter encoder disk. Of course the complete measurement with the SDSAMS is not based on the measurement of the position of a single mark, but sums the differences of angles between pairs of marks. As a result, we expect the variation in the complete measurement, due to bearing errors, to be substantially less than 20 arcseconds. While the actual values of the angles to individual marks don't matter for the SDSAMS, the angles should not change. Bearing errors effectively cause changes in the angles of the graduations for measurements made on different revolutions of the disks.

Figure 9:
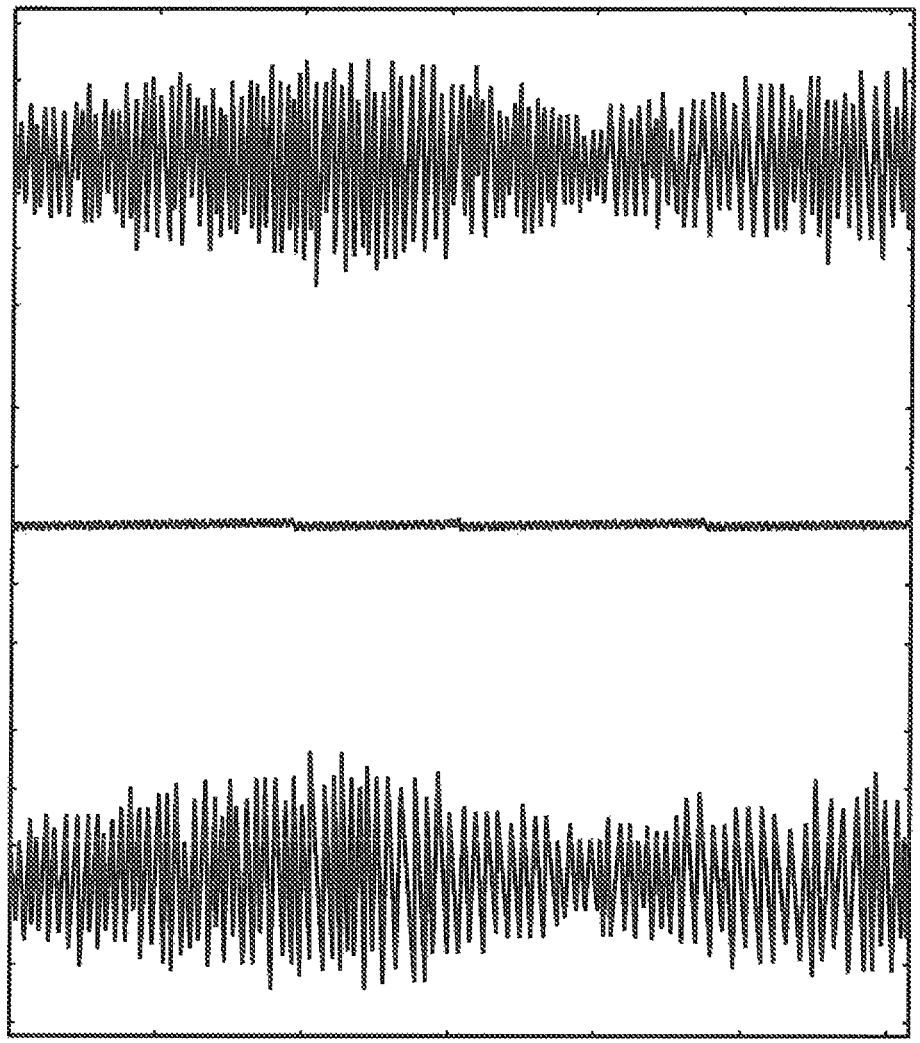
FIG. 9 shows short term noise and stability performance using one or two pairs of encoders in one possible implementation of the embodiments disclosed herein.

FIG. 9 shows the result of a three minute test where the rotary platform was held in a fixed position, using that position as the 0° position. The complete sequence of roughly 5000 measurements during this time period was recorded and is shown in FIG. 9. The sequence of measurements produced by two separate sets of encoders as well as the combined measurements produced by the first example implementation were recorded and are shown. Specifically, the two movable encoders on the rotating platform are numbered 3 and 4 and the two fixed encoders on the lower mounting plate are numbered 1 and 2. Encoders 3 and 4 are placed around the upper disk, separated by 180°. Encoders 1 and 2 are placed around the lower disk, also separated by 180°. The lower graph in FIG. 9 shows the measurements based on encoders 1 and 3 only. The upper graph shows the measurements based on encoders 2 and 4 only. The middle graph is the average of the upper and lower graphs, which is the result finally produced by the first example implementation.

The noise level in the results from encoders 1 and 3 and from encoders 2 and 4 are about 0.42 arc-seconds peak-to-peak. This is quite consistent with the level that would be expected due to bearing noise, when 10,000 measurements are summed. Also, since any lateral shift in a disk's position due to bearing noise will introduce an equal but opposite shift relative to the 180° opposite encoder, the measurement errors due to bearing error should nearly cancel when the results from both sets of encoders are combined. This occurs, as shown by the middle graph, which has a peak-to-peak noise level of less than 0.02 arcseconds.

Unfortunately, while error cancellation using two diametrically opposed encoders will compensate for the radial bearing errors, it will not compensate for angular velocity errors, or for axial motion of the disks. These factors, along with the fact that in practice the two encoders for one disk will never be separated by exactly 180°, are most likely the source of the residual noise level in the middle graph.

It should be noted that if the pairs of encoders were exactly separated by 180° then the three graphs in FIG. 9 would each be centered around the same value and overlap. The offset between the results from the two sets of two encoders is about 89.5 arcseconds, which represents the amount by which the placement of the diametrically opposed encoders differs from 180°. This would correspond to an error of about 0.00045 inches at the edge of a 2 inch in diameter encoder disk.

The first example implementation does exhibit some drift. A short term drift of a few tens of milli-arc-seconds typically occurs over time periods of ten to twenty minutes. This drift may be due to thermal changes gradually moving though the mechanism. Longer term drift of a few tenths of an arcsecond occurring over time frames of several hours is strongly correlated with changes in the ambient temperature. There is also noticeable drift of about 50 milli-arc-seconds in a minute or two, immediately after making an adjustment to the position of the rotating platform. This is most likely due to the mechanical bearings and adjustment mechanism "settling" into the new position. The radius of the main bearing races is roughly 1.75 inches and at that radius a change of 50milli-arc-seconds corresponds to a movement of less than a half of a millionths of an inch.

It should be emphasized that if the device is used for relative measurements over a reasonably short period of time, any longer term drift would not affect the measurement. That is, longer term drift would not represent a change in the accuracy of the device for relative angle measurements, but only reflects the fact that if the rotating platform were locked in one position for a long period of time, the angle measured for that position will gradually drift over time, largely due to thermal effects.

Testing of the first example implementation's response to small changes in angle was done using a piezo actuator. The specific piezo actuator and driver used (Queensgate DPT-C-S with Queensgate CM-150 control module) provide a total travel of approximately 15 microns and a smallest step of approximately 1 nanometer. The specified linearity for the piezo actuator with matched driver is 0.1% of full scale. The piezo actuator was attached to the device's frame in such a manner that it could exert a tangential force on the device's main rotary platform at a radius of 84 mm.

Figure 10:
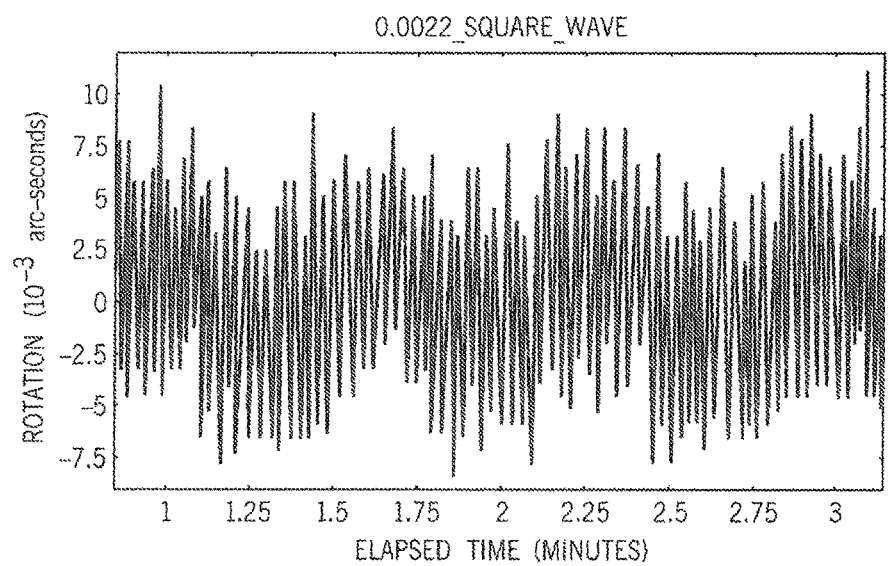
FIG. 10 shows the response to a one nanometer peak-to-peak square wave motion at a radius of 84 millimeters of one possible implementation of the embodiments disclosed herein.

As a first test, the piezo actuator was repeatedly stepped back and forth through its minimum step of 1 nanometer. A step of this magnitude at a radius of 84 mm should drive the device back and forth through a square wave with a peak-to-peak amplitude of 2.46 milli-arcseconds. The output of the device under this stimulus is shown in FIG. 10. The graph shows each individual measurement over approximately three cycles of the square wave. A motion of this magnitude is nearly lost in the noise level of the device, although the pattern of motion is detectable when multiple samples are observed. FIG. 10 also includes a graph of moving averages over intervals of length ½ the period of the square wave. The moving average graph is a triangle wave with a peak-to-peak amplitude of roughly 2 milli-arcseconds, as expected.

Figure 11:
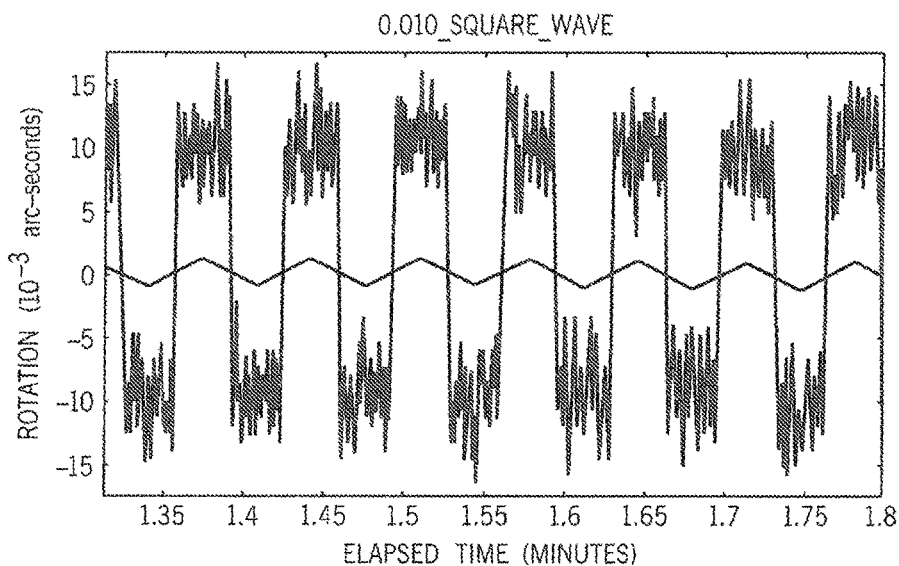
FIG. 11 shows the response to a ±10 milli-arcsecond square wave of one possible implementation of the embodiments disclosed herein.

For a second test, the actuator was repeatedly stepped back and forth through enough steps to give a square wave with a peak-to-peak amplitude of roughly 20 milli-arcseconds. The output of the device under this test is shown in FIG. 11. The FIG. also shows a graph of moving averages over intervals of 9 half-periods of the driving square wave. This should produce a triangle wave with amplitude equal to ⅑ of the square wave amplitude, or about 2.2 milli-arcseconds. The triangle wave of this amplitude is clearly visible. Based on these two examples, it appears that the device will be able to easily detect changes on the order of a milli-arcsecond using averages of multiple readings.

To test the accuracy of the device for small angles, the piezo actuator was repeatedly ramped up and down through its full range of motion, using the smallest step size supported by the Queensgate controller. The controller uses a 14-bit command word, so $2^{14}-1=16,383$ steps were repeatedly made in each direction. The step rate was set to roughly correspond to the sample rate of the first example implementation so there are approximately 15,000 individual measurements in each of the ascending and descending ramps. In all, FIG. 12 graphs nearly 120,000 measurements taken over more than one hour, as the piezo actuator was slowly ramped back and forth through its range.

Figure 12:
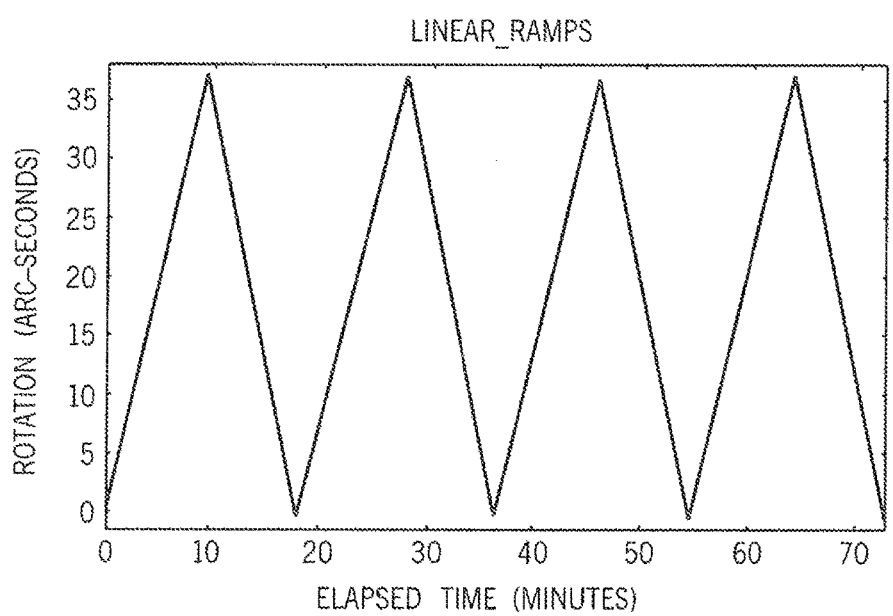
FIG. 12 shows the response to a 37 arcsecond triangle wave motion of one possible implementation of the embodiments disclosed herein.

The data shown in FIG. 12 were also examined more closely. Although the correspondence between the actuator displacement and angular position is not exactly linear, over such a small arc, the correspondence is essentially linear. To check the linearity of the device, the data for each of the positive going ramps was extracted and a line was fit to the data using least squares. The negative going ramps were similarly extracted and fit with a line. The RMS differences between the least squares lines and the measured values were between 8 and 15.3 milli-arcseconds for the eight ramps shown in FIG. 12. For the positive going ramps, the piezo material in the actuator was expanding and the maximum difference between the measured value and the least squares line did not exceed 32 milli-arcseconds. This is within the specified 0.1% linearity of the piezo actuator. For the negative going ramps, the piezo material in the actuator was contracting and the maximum difference between the measured value and the least squares line was about 45 milli-arcseconds near the start of the scan and less than 35 milli-arcseconds for the remainder of the scan. The error at the beginning of the scan slightly exceeds the specified 0.1% linearity specification of the actuator. This may be due to some residual hysteresis in the actuator or some small error in the motion of the main rotating platform as the direction of rotation reversed. In any case, the differences from linearity are well below the claimed 0.1 arcsecond accuracy of the first example implementation. It should be noted that this test shows that the embodiments disclosed herein do not have a complicated small angle error function since the response to small angular changes is very linear.

Figure 13:
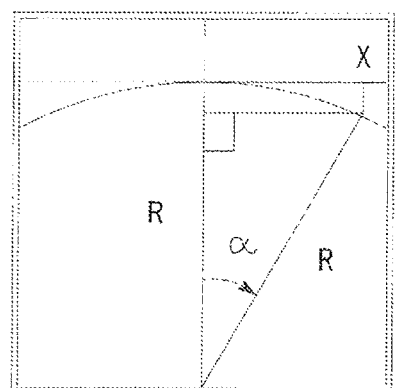
FIG. 13 is a conceptual drawing of the sine drive test performed on one possible implementation of the embodiments disclosed herein.

In order to evaluate the performance of the first example implementation over larger angles, a test was done using a precision linear stage to generate angular motions up to about 11°. A conceptual diagram of the test apparatus is shown in FIG. 13. The correspondence between the distance moved along the x-axis and the angle is non-linear. Specifically, since $\sin(\alpha)=x/R$ the angle $\alpha=\arcsin(x/R)$. The angle $\alpha$ is measured by the first example implementation.

The actual test was conducted as follows. One end of a 12 inch long granite bar was fastened to the main rotary platform of the device. A 1 inch in diameter ball bearing was attached to the other end of the granite bar. The effective radius, R of the test setup is the distance from the center of the ball bearing to the axis of rotation of the main rotary platform. A small optical flat was mounted on the moving platform of a precision linear stage, with its face perpendicular to the x-axis. The ball bearing at the end of the granite bar was held against the face of the optical flat by a strong magnet behind the optical flat. Motion along the x-axis was controlled by setting the position of the moving platform of the linear stage, under computer control. The particular stage used (Klinger MT160) has a precision diamond corrected lead screw that is turned by a stepper motor through a precision planetary gearhead. The accuracy of the lead screw is specified as ±2 microns over 100 mm with a repeatability of about 1.0 micron for successive motions over 20 mm. The smallest full step of the stepper motor moves the stage by 1 micron. A Parker micro-stepping drive was used to drive the stage in 0.1 micron steps.

Figure 14:
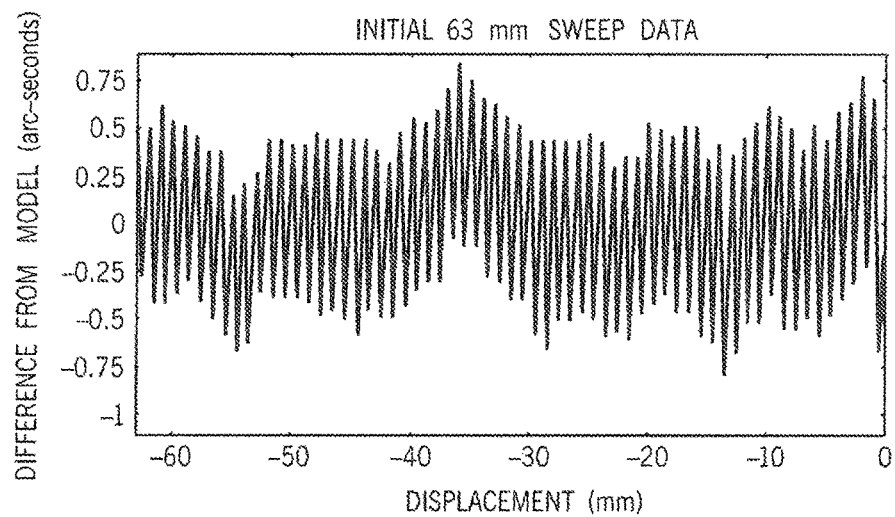
FIG. 14 shows errors on the order of one micron in the motion of a precision linear stage. The errors were observed by measuring angular changes at a distance of 305 millmeters using one possible implementation of the embodiments disclosed herein.

The test was performed by stepping the linear stage through a distance of 63 mm in steps of 0.1 micron, at a rate roughly corresponding to one step per reading of the angle on the first example implementation. The time required for one test was a little under 6 hours and more than 600,000 samples were taken. The angular range covered was from roughly −5.6 degrees to roughly +6.2 degrees. A non-linear least squares fitting routine was used to fit the data to the sinusoidal model described above. The difference between the data and model at all 600,000 sample points is shown in FIG. 14. Note: The x-axis is labeled with the total distance along the x-axis. The zero position for the angle α is at about −33 mm along the x-axis in FIG. 14.

The errors shown in FIG. 14 range between ±0.75 arcseconds, which is much worse than the claimed 0.1 arcsecond accuracy of the device. However, on closer inspection we see that the main part of the error is a periodic variation with an amplitude of roughly ±0.5 arcseconds that is shifted by varying amounts along the path. The effective radius R of the granite bar is 305.811 mm and at that radius, a change of 1 micron corresponds to an angular change of about 0.67 arc-seconds. The periodic variation in the error repeats precisely every 1 mm, which is the pitch of the lead screw in the linear stage. The errors that these data are showing appear to be largely the error in the motion of the linear stage, due to lead screw errors and other errors in the motion of the stage. That is, it appears that FIG. 14 is showing lead screw errors on the order of 1 micron or less in great detail by observing angular changes from a distance of about 1 foot.

Figure 15:
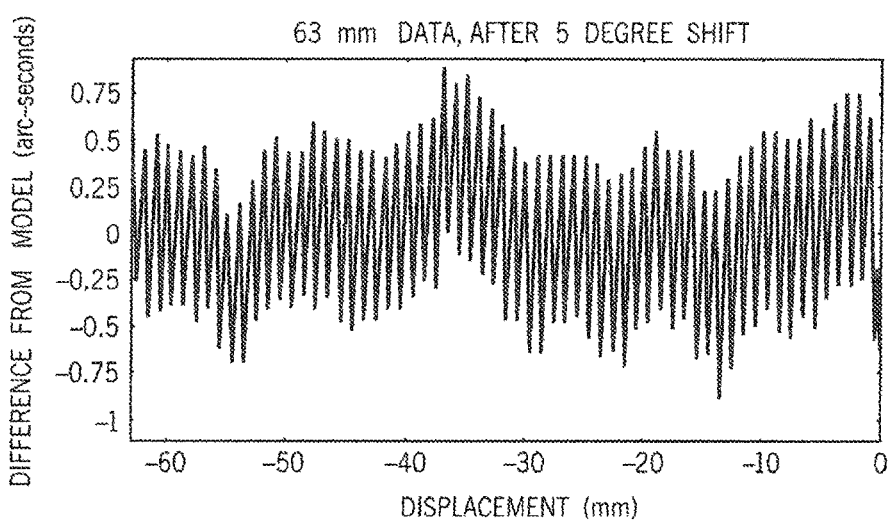
FIG. 15 shows errors on the same portion of travel of the precision linear stage as shown in FIG. 14, using a different range of angles measured by one possible implementation of the embodiments disclosed herein.

To test this hypothesis, the mounting of the granite bar on the rotary platform of the device was adjusted so that the angle was shifted by 5° which is about half of the range swept out during the test. The test was then run again, using exactly the same portion of the travel range of the linear stage. If the pattern of errors was due to errors in the angle measurement made by the first example implementation, the pattern should shift in the new data. If the pattern of errors was due to errors in the motion of the linear stage, the pattern of errors should be nearly unchanged. FIG. 15 shows the results of running the test after shifting the angular range covered by the first example implementation. There is very good agreement between the error patterns shown in FIGS. 14 and 15. In particular, the RMS difference between the curves is 0.077 arcseconds, over the full set of roughly 600,000 measurements. This error is actually a combination of any errors in the angle measurements made by the first example implementation and any errors due to less than perfect repeatability of the linear stage's travel. Thermal drift of any portion of the experimental setup during the roughly twelve hour test period would also add to the measured error. An error of 0.077 arcseconds at a radius of 305 mm would correspond to an error of slightly more than 0.1 micron in the linear stage's position which is much less than the linear stage's repeatability. In any case, it certainly appears that the RMS error in angle measurement by the first example implementation is no more than 0.077 arcseconds over the 11° interval covered by this test and is probably significantly less than that.

The full circle accuracy of the device was tested using a slightly modified version of the well-known dual closure method. The dual closure method allows for the simultaneous calibration of two devices at N uniformly spaced angles around the circle. No external standard is needed. The calibration ultimately relies on the mathematical fact that the sum of the differences between successive angles around a circle is precisely 360°.

The tests were carried out using the first example implementation as one of the two devices and an optical polygon as the second of the two devices. Complete tests were run using polygons with N=8, 12, 15, 17 and 18 sides. Partial tests were carried out with a polygon with N=72 sides. The tests with all of the different polygons provided very consistent results. Since the partial test with the 72 sided polygon also provides information about higher harmonics in the error function than can be seen in the tests with the smaller polygons, the results of the test with the 72-sided polygon will be discussed in more detail.

A complete test with an N-sided polygon requires N(N+1) measurements and constructs a system of $N^2+2$ linear equations in 2N unknowns. The 2N unknowns are the errors at the N evenly spaced points for each of the two devices used. For example, for a complete test with N=12, 156 measurements are needed which leads to 146 linear equations in 24 unknowns. A complete test with N=72, would require 5,256 measurements, and would lead to 5,186 equations in 144 unknowns. The resulting system of equations is over-determined (extremely so for large N), and can't be solved exactly due to experimental errors in the measurements. However, the system can be solved in the least squares sense to provide the set of values that most nearly satisfies all of the equations.

Figure 16:
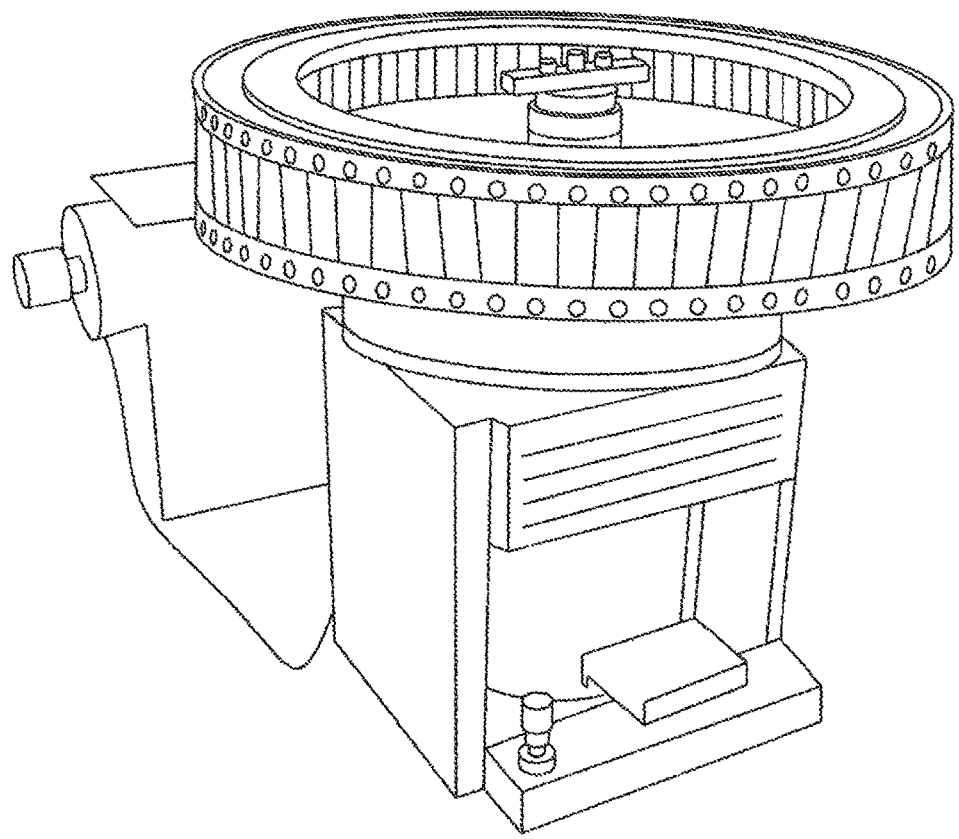
FIG. 16 shows a 72-sided optical polygon mounted for measuring the errors in one possible implementation of the embodiments disclosed herein.

FIG. 16 shows the test set up with the 72-sided polygon. The polygon is mounted on the top of the rotary platform of the first example implementation. The rotary platform also has a worm gear attached that is driven by the stepper motor shown on the left side of the image. The electronic autocollimator is pointed at a face of the polygon.

The test with the 72-sided polygon was carried out as follows. First, the platform of the device was rotated to the point where the measured angle was 0° plus a small increment (30 arc-seconds) to avoid possible ambiguity due to measurement noise causing values to jump from slightly less than 360° to slightly more than 0°. Next, the 72-sided polygon was fastened to the top of the rotating platform with its 0° face perpendicular to the axis of the electronic autocollimator to within 5 arc-seconds. The autocollimator was used as a null detector to avoid autocollimator calibration error.

Data for this setting of the polygon on the table was then collected at each of the faces of the polygon. Specifically, the stepper motor was commanded to move each face, in turn, to be roughly perpendicular to the axis of the autocollimator. The autocollimator reading was then used as an error signal, and the data acquisition program adjusted the rotation of the polygon to zero out the reading from the electronic autocollimator. The difference between the angle measurement at that point and the corresponding evenly spaced angle value is the sum of the errors in that polygon face and the angle measuring device at that point. This process was repeated 73 times, starting at face 0 and eventually returning to face 0 again after carrying out the process at each of the other faces. The 72 differences between these measurements at 73 successive faces gives 72 linear equations in 144 unknowns. The fact that the sum of the errors in the differences around the full circle is zero for both the polygon and the angle measurement device give two additional linear equations in the 144 unknowns.

After making measurements of all faces of the polygon with the 0° face fixed at the initial position of the angle measurement device, the position of the polygon on the table was adjusted so that the 0° face was fixed at the second evenly spaced position of the angle measurement device. The process described in the previous paragraph was then repeated entirely, making 73 measurements using the faces at 0°, 5°, 10°, . . . , 350°, 355°, 0° at this setting of the polygon on the rotating platform, to obtain another 72 linear equations.

In our test, this process was repeated 15 times, starting with polygon face 0 fixed at uniformly spaced positions on the angle measurement device ranging from essentially 0° to essentially 70° in 5° increments. This provided 15 ×72 +2=1082 equations in 144 unknowns. The results of solving these equations (in the least squares sense) are shown in Figs. 17-20.

Figure 17:
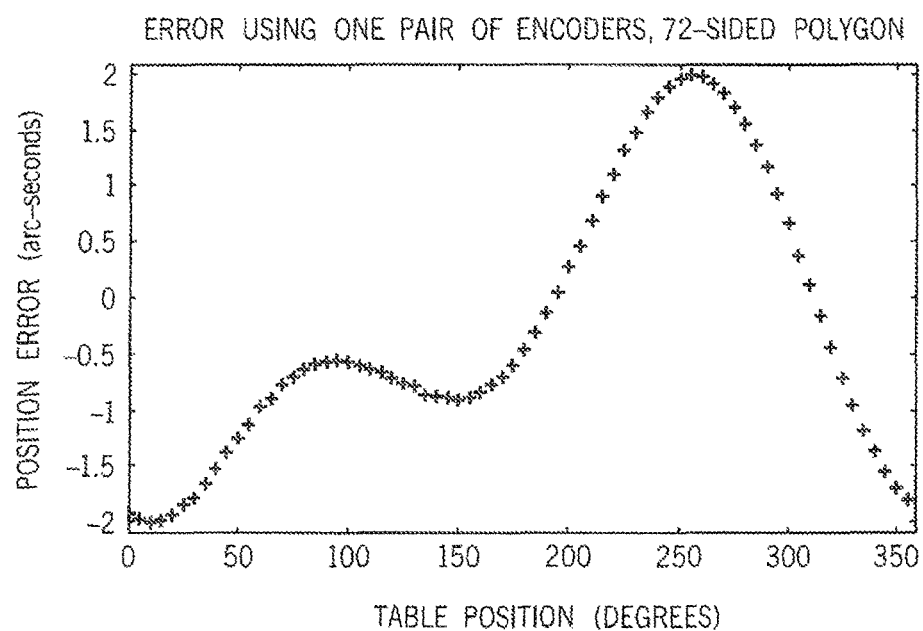
FIG. 17 shows the uncorrected measured error in one possible implementation of the embodiments disclosed herein, when only two encoder modules were used.

The data were collected and analyzed in two ways. In the first case, the data from 180° opposite encoder pairs was NOT used. That is, in the first case the angles were only measured using encoders 1 and 3. In this case the error in the angle measurement device ranged between −2 and +2 arc-seconds as shown in FIG. 17. These sub-optimal results are expected, since the error-cancelling benefits of using data from 180° opposite pairs have been intentionally omitted.

Additional meaningful information about the error function is obtained by taking the discrete Fourier transform of the error data. The magnitude of the Fourier transform shows information about the harmonic structure of the errors. Since there are 72 evenly spaced sample points around the circle, by the sampling theorem, the Fourier transform will have information on harmonics up to the $36^{th}$ harmonic. That is, patterns that repeat every 10° or slower, will show up in the Fourier transform. This information will complement the previous test which covered an interval somewhat larger than 10° in length.

Figure 18:
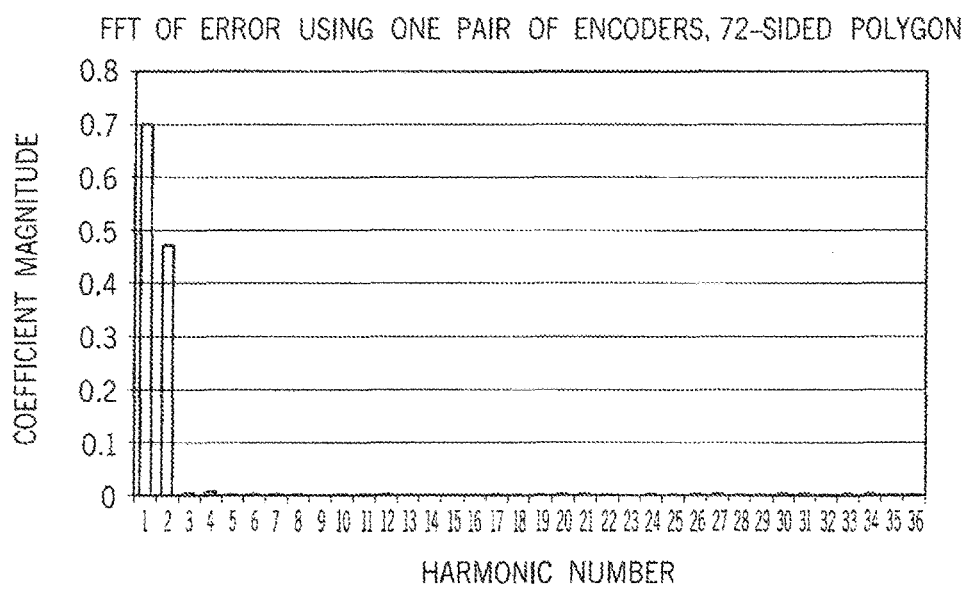
FIG. 18 shows the Fourier transform of the uncorrected measured error in one possible implementation of the embodiments disclosed herein, when only two encoder modules were used.

FIG. 18 shows the Fourier transform of the data in FIG. 17. As expected, there is a strong fundamental ("once around error") visible in the Fourier transform. The relatively large noise level in data from a single pair of encoders shown in FIG. 9, was smoothed out in this experiment by measuring the angle at each polygon face for about 1.5 minutes and averaging the measurements. As will be discussed later in regard to angular velocity errors, the remaining first order error is due to the systematic interaction of the angular velocity errors in the rotation of the pair of disks with eccentricity error in the mounting of the disks along with any other first order errors in the positions of marks on disk. The surprising thing is that essentially all of the errors are concentrated in the fundamental and second harmonic. All higher harmonics, up to the $36^{th}$ harmonic are essentially zero. This is very useful information. If we can substantially reduce the first and second harmonic error, we can reduce all errors to a very low level.

Figure 19:
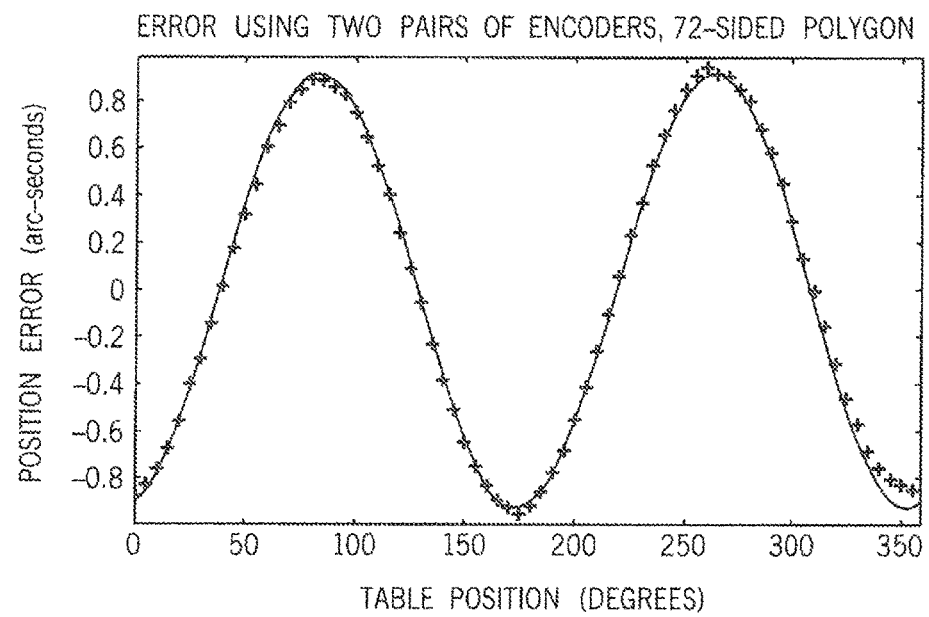
FIG. 19 shows the uncorrected measured error in one possible implementation of the embodiments disclosed herein, when a total of four encoder modules were used.
Figure 20:
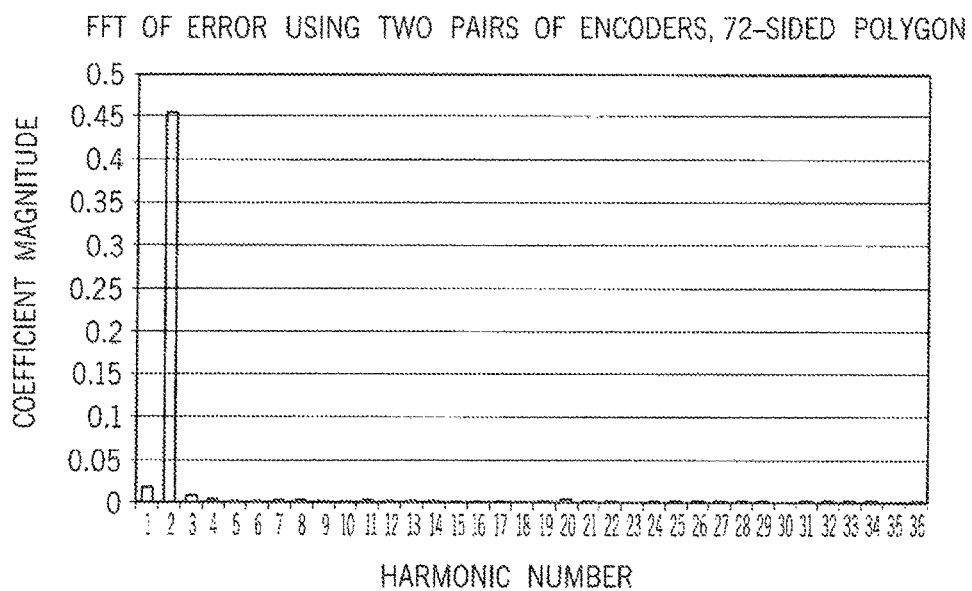
FIG. 20 shows the Fourier transform of the uncorrected measured error in one possible implementation of the embodiments disclosed herein, when a total of four encoder modules were used.

The fundamental "once around error" can be reduced to very low levels just by using data from two pairs of encoders, separated by 180°. FIG. 19 shows the errors that result when the data from encoders 1 and 3 is combined with the data from encoders 2 and 4. In this case the error curve is nearly a pure second harmonic sinusoidal function. The Fourier transform of this error function is shown in FIG. 20. As expected, the fundamental has been substantially reduced and most of the remaining error is concentrated in the second harmonic. In FIG. 19, the measured error data points are marked by the "+" symbols and the solid curve shows the best fit sinusoidal function. The difference between the data values and the best fit sinusoid is less than 0.1 arcseconds, so using the best fit sinusoidal function to correct the calculated angle reduces the error to less than 0.1 arcseconds.

The portion of the second harmonic error that is due to motor speed errors and disk mark errors can be reduced by using three or four encoders equally spaced around a circle on upper rotating platform. Suppose that there is no axial runout in the main bearing and that the two cycle error curve in FIG. 19 is due entirely to motor speed errors and disk mark errors. To see how this works for four encoders on the rotating platform, note that the error using one pair of encoders on the upper rotating platform, separated by 180° gives readings with errors that are essentially pure second harmonic functions, as shown in FIG. 19. If we add a second pair of encoders shifted by 90° from the first pair, the data being measured by the second pair will have an error that is 90° further along the error curve than the first pair. If we subtract 90° from the measurement from the second pair and average it with the reading from the first pair, the errors will cancel. That is, the sum of the errors at any two points separated by 90° would be exactly zero if the error was exactly a two cycle sinusoidal function. NOTE: Adding encoders may NOT cancel measurement errors due to axial runout of the main bearings, since such errors will affect all encoders on the rotating platform simultaneously.

Similarly, it can be shown that as few as three equally spaced encoders on the upper rotating platform will ensure cancellation of the portion of the two cycle sinusoidal component of the error function that is due to motor speed errors and disk mark errors. More generally, the number of encoders and the number of magnetic pole pairs on the motor can be adjusted for different applications to balance cost, size, reading noise and residual errors.

Figure 21:
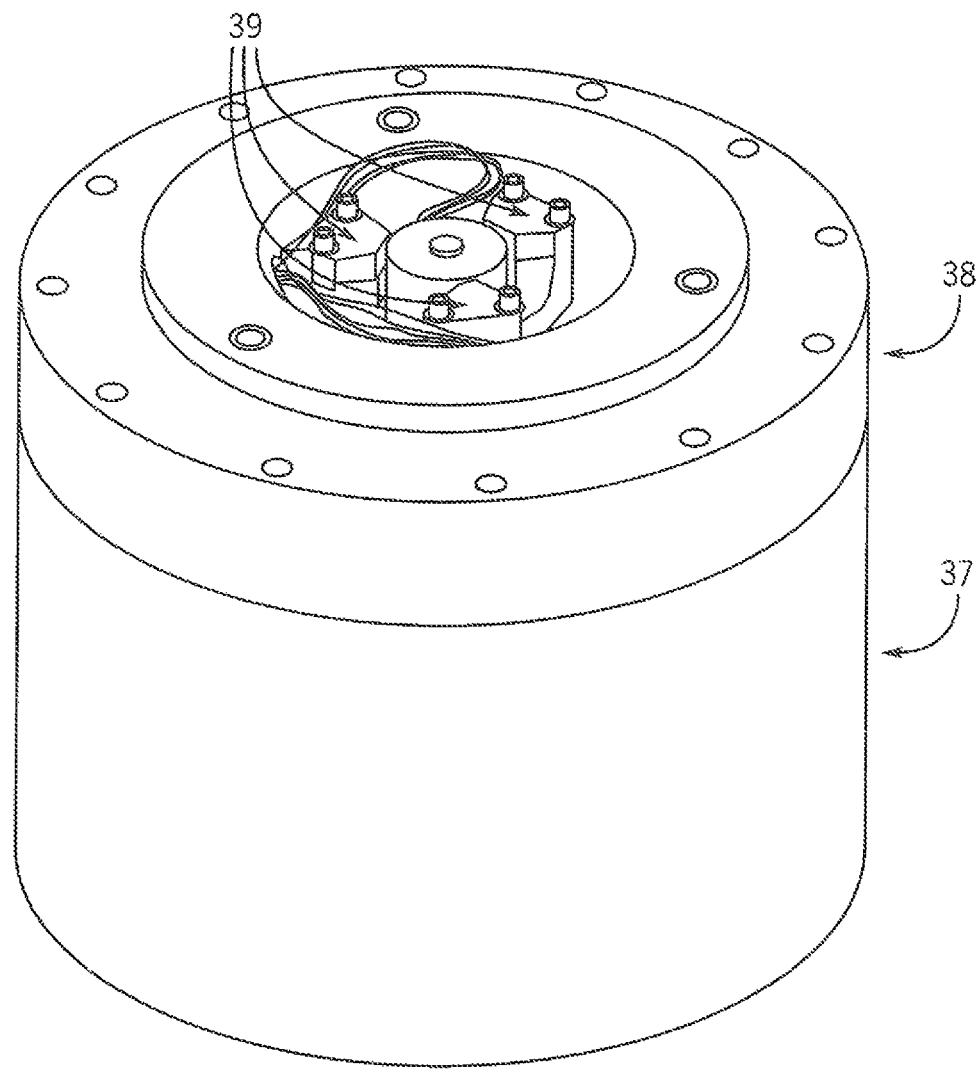
FIG. 21 is an image of the sensor unit for a second possible implementation of the embodiments disclosed herein.
Figure 22:
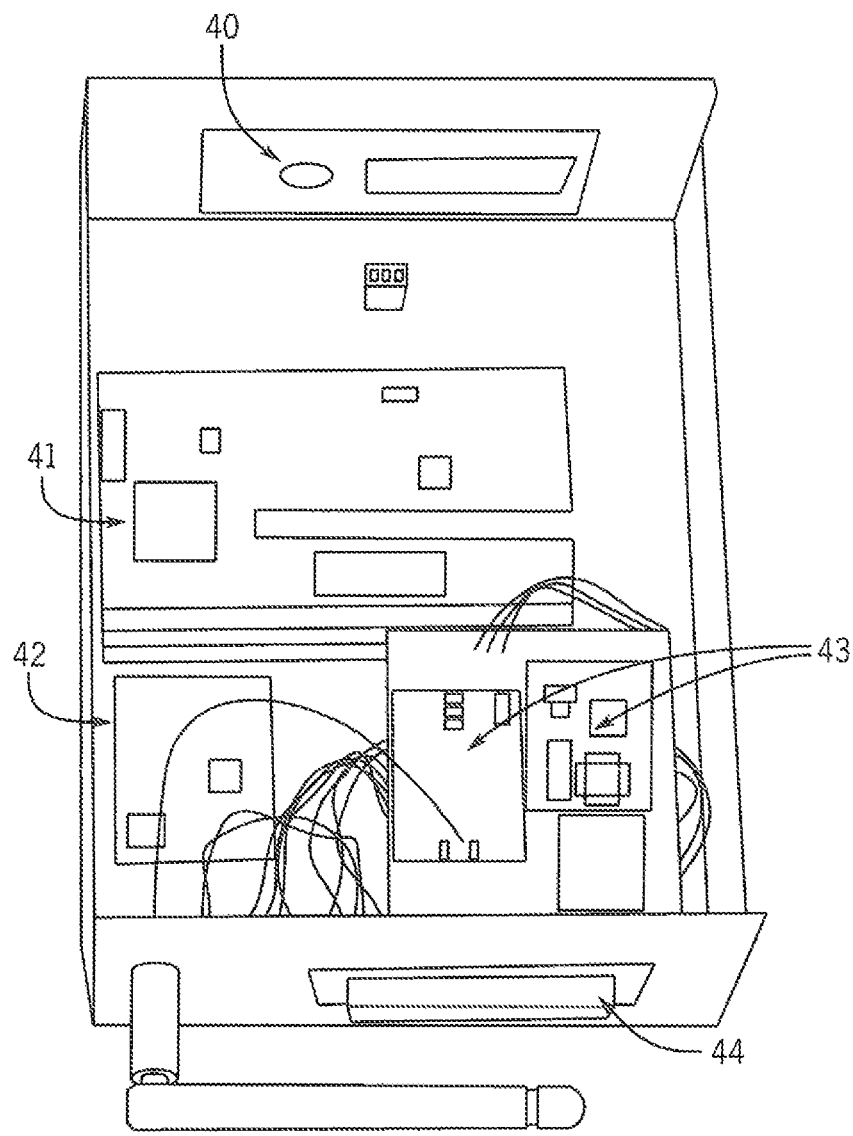
FIG. 22 is an image of a signal conditioning and computation unit for a second possible implementation of the embodiments disclosed herein.

A second sample implementation was constructed to illustrate these concepts. The second sample implementation's sensor head and electronics package have the same overall design as the first sample implementation with several changes. The second sample implementation sensor head is pictured in FIG. 21, with the upper cover plate removed, and the electronics package is pictured in FIG. 22. The principal changes incorporated in the second sample implementation are:

- The main bearing housing, 37, is cylindrically symmetric, rather than rectangular, and extends from the upper clamp ring for the main bearing, 38, to the base of the unit. This implements the original design concept of maintaining symmetry about the axis of rotation of the disks when possible. This also reduces uneven radial pressure on the main bearings due to uneven residual stress in a rectangular main bearing housing as was used in the first sample implementation. Uneven radial pressure can "pinch" the main bearing horizontally, leading to increased axial runout.
- The rotating platform carries three encoder sensor modules, 39, separated by 120° around the upper encoder disk. There are another three fixed encoder sensor modules fastened to a mounting plate in the main bearing housing. Data from each of the three moving encoders is combined with data from each of the three fixed encoders and the results of all nine combinations are shifted appropriately and then averaged. This reduces or eliminates the portion of the second order error that is due to the interaction of motor speed variations and encoder disk mark position errors.
- The drive motor rotor has five north-south pole pairs formed from twenty neodymium magnets arranged in a Halbach array. The stator consists of fifteen small ferrite core inductors epoxied in a machined Kevlar filled nylon ring. The coefficient of thermal expansion for Kevlar filled nylon nearly matches that of aluminum.
- The main bearings are a larger pair of precision of axial angular contact bearings with a 60° contact angle, instead of a pair of precision spindle bearings with a 25° contact angle. This increases the axial rigidity of the main bearing assembly.
- The thrust bearing for the axle carrying the spinning disks consists of a silicon carbide ball pressing on a hardened 440C steel thrust plate. This particular combination of materials was chosen to reduce the wear rate.

The computations previously described are carried out in a prototype electronics package built around four inexpensive XMOS StartKit development boards, 41, instead of a single quad core development board. The microprocessors monitor the data and communicate via a simple bus arrangement and process the data from the encoders in parallel. This architecture replaces the now obsolete development board used in the first sample implementation with less expensive current hardware. The structure uses one development board as the "master" to control the sequencing of the calculations and to output the results. The bus structure can be easily configured with between one and eight "slave" processing units that perform the calculation over successive overlapping complete revolutions of the encoder disks, The resulting angular measurements are streamed out over one or both wired and wireless Ethernet connections, 43. The same signal conditioning circuitry, motor control unit, 42, and display, 40, are used as were used in the first sample implementation. To accommodate data from the larger number of encoders, a 37-pin connector, 44, and cable are used.

As before, the full circle accuracy of the second sample implementation was tested using the dual closure method and polygons with 12, 17 and 72 sides. Complete dual closure tests were run using 12 and 17 sided polygons. The test with the 72 sided polygon used 23 sets of 73 measurements with the sets having the polygon's face 0 fixed at angles 0°, 5°, 10°, . . . 110° respectively. The results of the tests with the different polygons were consistent.

Figure 23:
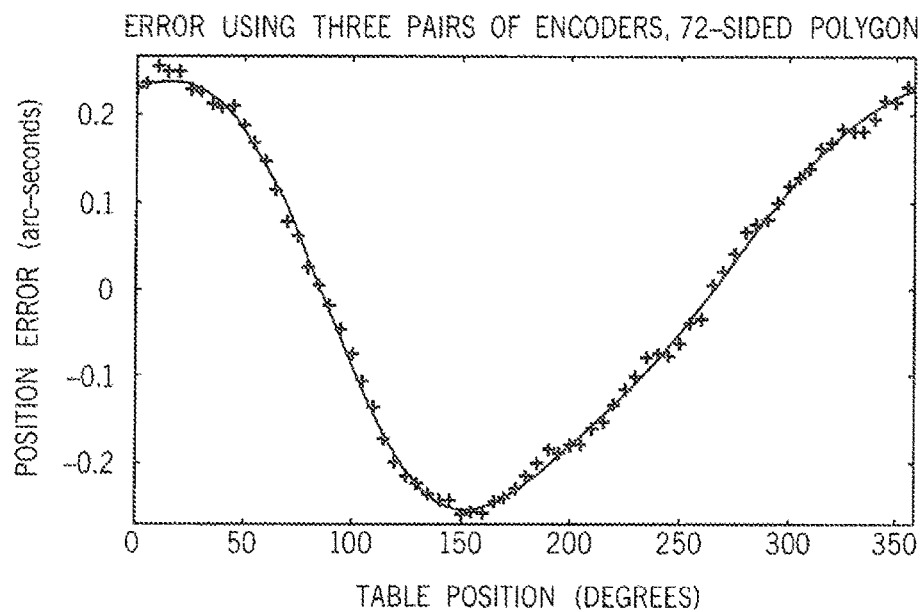
FIG. 23 shows the uncorrected measured errors in a second possible implementation of the embodiments disclosed herein, when a total of six encoder modules were used.
Figure 24:
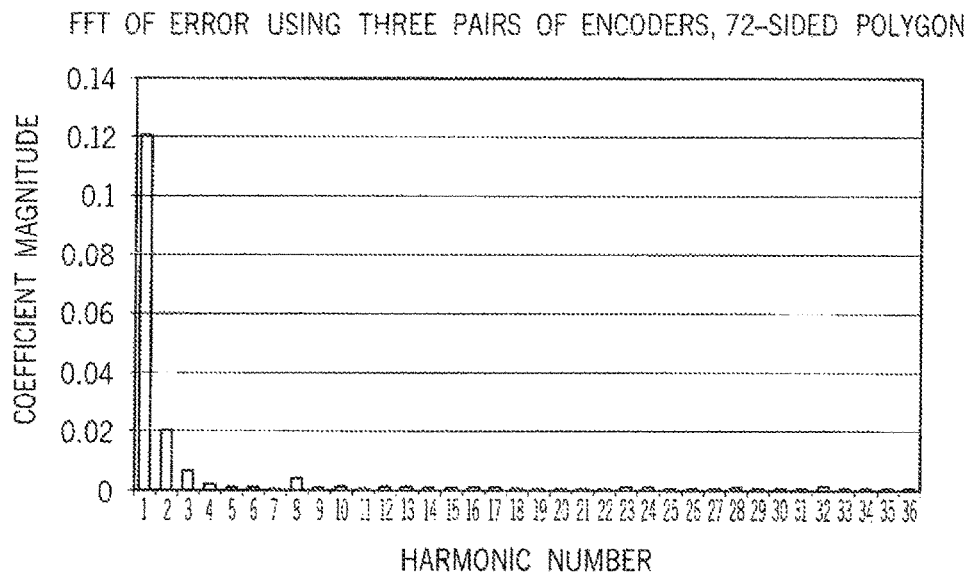
FIG. 24 shows the Fourier transform of the uncorrected measured errors in a second possible implementation of the embodiments disclosed herein, when a total of six encoder modules were used.

Since the test with the 72 sided polygon can reveal higher harmonics in the error function, those results are shown in FIGS. 23 and 24. The points marked in FIG. 23 show the raw uncorrected errors at 72 evenly spaced positions around the circle. The solid line shows the systematic error in the measurements determined from the first three Fourier coefficients. FIG. 24 shows the Fourier transform of the uncorrected errors. The error function is a slowly varying function of the angle which could be easily corrected using a best fit low order trigonometric sum as a calibration curve.

As expected, the magnitude of the second harmonic error in the second sample implementation has been substantially reduced compared to the second harmonic error in the first sample implementation. Specifically it was reduced by a factor of more than 20, to approximately 0.02. The inherent raw uncorrected error was also reduced from an amplitude of approximately 0.9 arcseconds to an amplitude of approximately 0.25 arcseconds peak-to-peak. In both sample implementations the error is slowly varying and could be easily corrected using a low order trigonometric function as a calibration curve.

The embodiments disclosed herein provide a means to exactly measure angles if the following conditions could be met:

The times when marks pass the reference point are measured with perfect accuracy.

The platform holding the movable sensor(s) rotates in perfectly circular motion with zero radial and axial runout.

The two disks rotate together about an axis with zero radial and axial runout and that axis is perfectly coaxial with the axis of rotation of the sensor platform.

The two disks rotate at a precisely constant angular velocity.

Any physical embodiment of these concepts will fail to meet these conditions to some extent. The following paragraphs discuss the errors due to failing to meet these conditions. It should be noted that there are both random, non-recurring errors and systematic repeatable errors. Since random errors can be dealt with by averaging multiple measurements, the systematic repeatable errors are often the most serious and difficult to deal with.

Errors in the actual measurement of the times when marks pass reference points have several origins. First, there will be some uncertainty in the times when the optical encoder modules switch their output on the A, B or I channels based on the optical signal. The output of the encoder heads are nominally square waves, but the encoder modules used in the example implementations produce signals which have rise and fall times on the order of 100 nano-seconds. The signals from the encoders will be slightly delayed and subject to various sources of noise as they travel to the Schmidt trigger signal conditioning circuits. There will be some uncertainty in the times when the Schmidt triggers actually switch their outputs based on the somewhat distorted signal they actually receive from the encoder modules. There will be propagation delays on the order of 10 nano-seconds through the Schmidt triggers and XOR gates. There will be some uncertainty in the time when the input circuitry on the microprocessor port detects a transition on the input signal. The microprocessor input ports are clocked by a 100 Mhz signal, and times are measured in 10 nano-second steps in the microprocessor, which will introduce some quantization error. Finally, there will be some error in the microprocessor clock itself.

Some of these errors will be systematic. In particular, all of the signal delays involved are systematic. Also, since any transitions on the inputs of the microprocessor will be time stamped at the next 10 nano-second clock pulse, the quantization error could be considered a systematic delay of 5 nano-seconds along with a random error around that delay. Fortunately, such systematic timing errors don't matter for the following reasons. First, some of the delays affect all of the signals and it's the differences between transition times that are important. To the extent that all signals are delayed equally, the delay will cancel in the difference. Second, if some channel is systematically delayed by more than another channel, the effect is that the corresponding sensor is slightly displaced tangentially or equivalently that the set of angles viewed by that sensor are slightly misplaced. However, since the actual value of the angles to the marks on the disk are not critical, this type of systematic error can also be ignored.

There may also be a systematic drift in the microprocessor clock. However, the microprocessor clock is ultimately controlled by a crystal oscillator, so the drift should be quite small over the roughly 0.1 second time frame of one revolution of the rotating disks. Since the measured times are scaled by the total time for one revolution of the disks, the absolute time measurement is non-critical.

The remaining timing errors are random, such as variations in the triggering times of the Schmidt triggers on the rising and falling edges of the signals from the encoder modules. It should be noted that a timing error of 10 nano-seconds could matter. Specifically, in the example implementations, the total revolution time is on the order of 0.1 second, or less so a systematic shift of 10 nano-seconds is a change of one part per ten million or more. As an angular change, a change of one part per ten million is a change of about 0.1 arcseconds.

Fortunately, it appears that the net effect of all of the possible random timing errors (together with random disk rotation errors) is small. Specifically, the random errors should show up as variations in the measured angle when the rotating platform is held fixed. However, the experimentally observed variations are small compared to the claimed accuracy of the device. For the first sample implementation, with the rotor fixed and relatively constant temperature, standard deviations of sets of 100 to 10,000 measurements are typically less than 4 to 5 milli-arcseconds, with nearly 100,000 measurements held in a total range of ±25 milli-arcseconds.

The main bearing supporting the rotating platform will constrain its motion to be nearly circular, but no bearing is perfect. The duplex pairs of angular contact bearings used in the example implementations have specified radial and axial runouts on the order of 0.0001 inch. An air bearing can reduce this error by one or two orders of magnitude, but even an air bearing is not perfect.

It is useful to consider the somewhat imperfect movement of the rotating platform to be the sum of a pure rotation plus a small axial or radial shift. The shift component of the motion causes problems when making measurements at a finite distance, such as when using a mechanical tangent arm or sighting a calibration point at a finite distance with a telescope mounted on the platform. For example, a lateral offset of 0.0001 inch at a radius of 10 feet would cause an angular error of 0.17 arc-seconds. However, it should be noted that this type of error is not specific to the measuring principle used in the embodiments disclosed herein. Regardless of the way a measuring device works, shifts in the axis position due to bearing errors will cause errors in measurements made at a finite distance. Fortunately, in many metrology applications, the measurements are made using an autocollimator focused at infinity and pointing at a plane mirror. In this case the measurement is effectively made "at infinity" and the effect of a small lateral shift of 0.0001 is minimal.

In the example implementations, the upper support bearing for the shaft carrying the rotating disks is centered on the rotating platform. As a result, the distance from the average shaft position to each of the encoder modules on the platform is fixed. That is, although there will be slight deviations from circularity in the rotation of the main platform itself, the encoder modules move with the main platform and are always precisely the same distance from the average shaft position. Any lateral shift of the main rotating platform due to main bearing error will not lead to a shift of the encoder modules relative to the rotating disks, so it will not directly affect the measured angle. Meanwhile, the rotation component of the motion of the main platform will create a rotation of the encoder modules relative to the rotating shaft and will lead to a change in the measured angle, as it should.

Axial runout of the main bearing will lead to slight axial shifts in the position of the rotating disks relative to the encoder modules. Axial shifts of the disks relative to the encoder modules will be discussed later.

From these observations we conclude that by mounting the upper support bearing for the rotating shaft on the rotating platform, the effect on the measured angle of lateral shifts due to main bearing error is effectively eliminated for measurements made "at infinity". For measurements made at a finite distance, the main bearing error will lead to the same sort of measurement errors as would occur with any mechanism for measuring angles.

We now consider four aspects of geometrical errors in the axis of the rotating disks. First, the deep groove instrument bearings that support the shaft radially are not perfect. Second, the upper axis support bearing will not be perfectly centered on the rotating platform. Third, the axis of the rotating disks will be slightly tilted relative to the axis of the main rotating platform. Fourth, the position of the disks relative to the encoder modules in the axial direction will not be precisely constant. Each of these aspects will be discussed in turn.

First, as seen in the test results, the errors due to radial imperfections in the deep groove instrument bearings show up as part of the roughly 0.42 arc second peak-to-peak noise in the measurements from single pairs of encoders. Since in the example implementations, the shaft is not fixed to the inner race of the bearings, errors in the motion of these bearings in the axial direction will not force the shaft and disks to move in the axial direction. Therefore, the main contribution of these bearings to measurement errors will be due to radial runout. However, as seen in the tests results, this error is cancelled to within about 20 milli-arcseconds peak-to-peak by using two pairs of encoder modules separated by 180°. This is well below the claimed 0.100 arcsecond accuracy of the device.

Second, as described in the detailed discussion of the construction of the example implementations, the upper support bearing can be centered on the axis of the rotating platform to within about 0.0001 inch. This is within the radial runout rating of the instrument bearings, so any error due directly to this centering error should be no more than about 20 milli-arcseconds, based on the observations made in the previous paragraph. This is also well within the claimed accuracy of the device.

Third, if the lower axis support bearing is not exactly centered on the axis of rotation of the main rotating platform, the axis of rotation for the rotating disks will be slightly tilted relative to the main platform's axis of rotation. There will also be variations in this tilt error as the main platform rotates, due to the centering error of the upper support bearing, and due to radial runout of the main rotating platform angular contact bearings.

During assembly, the position of the lower support bearing is adjusted to reduce the tilt error to roughly 10 arcseconds or less. To allow for wear and some additional tilt error due to the factors just mentioned, we will assume that the maximum tilt error could be as large as 20 arcseconds.

We next quantify the measurement error due to the axis tilt error. Note that if the main platform rotated exactly around the same axis as the rotating disks, then there would be no tilt error. If, however, the main platform rotates around an axis tilted relative to the axis of the disks, then we are effectively measuring a rotation about one axis (the axis of the disks) while the actual rotation is about a different axis (the axis of the rotating platform). Measuring a rotation about a tilted axis will always introduce an error. The error will be small for small tilts, but the error will be non-zero.

Figure 25:
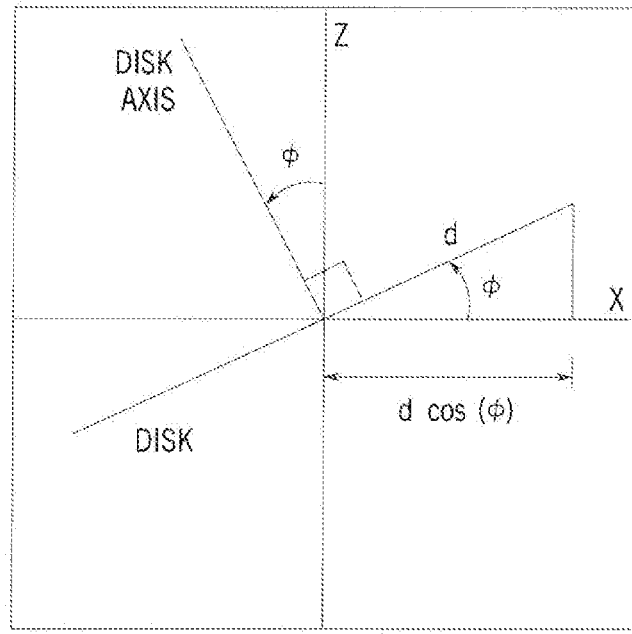
FIG. 25 is a diagram showing a tilted axis of rotation for the analysis of the errors in one possible implementation of the embodiments disclosed herein.

Without loss of generality, assume that the main platform rotates about the z-axis, and that the disks rotate about an axis that is tilted in the xz plane, obtained by rotating the z-axis about the y-axis through an angle $\phi$, as shown in FIG. 25. In this FIG., the positive y-axis is pointing into the page through the origin. If a point in the plane of the disk is at a distance d from the y axis, then the x coordinate of the rotated point will be reduced to $d \cdot \cos(\phi)$. The y coordinate of the marks will not be changed in this case, since the tilt is assumed to be a rotation about the y-axis.

Figure 26:
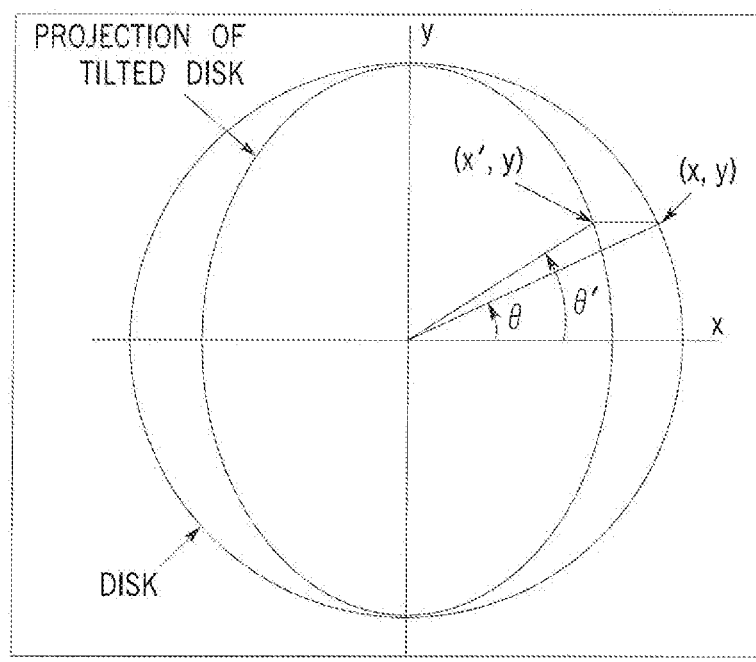
FIG. 26 is a diagram showing another view of a tilted axis of rotation for the analysis of the errors in one possible implementation of the embodiments disclosed herein.

If we view the disk from above, as in FIG. 26, we see that a circular disk in the xy plane will appear elliptical when it is tilted through the angle $\phi$ and then projected back onto the xy plane. In this FIG. the positive z-axis is pointing out of the page through the origin. The rotation angle $\phi$ is actually very small, but the figures are drawn as though $\phi$ is much larger, for clarity. If we assume that the optical axis of the encoder modules is parallel to the z axis, the marks on the disks are effectively projected onto the plane of the encoders with an orthographic projection along lines parallel to the z-axis. Consequently, FIG. 26 shows the tilted disk as an ellipse, which is how it would be seen by the encoder modules. Now, a point (x,y) at angle $\theta$ on the edge of a unit circle in the xy plane would be rotated up out of the xy plane by the tilt angle $\phi$ and subsequently projected back onto the point (x', y), where x'=x·cos($\phi$)

As a result, a rotation by angle $\theta$ about the tilted axis will be measured as a rotation by angle $\theta'$ about the z-axis. The relationship between the measured angle $\theta'$ and the original angle $\theta$ is given by equation 26 for angles strictly between $-\pi/2$ and $+\pi/2$.

$$\theta' = \arctan\left(\frac{y}{x'}\right) \quad (25)$$

$$= \arctan\left(\frac{\sin(\theta)}{\cos(\theta)\cos(\phi)}\right) \quad (26)$$

More generally, using the full-circle atan2( ) function, we have the following expression for the measured rotation for any angle in $(-\pi,\pi]$.

$$\theta' = a\tan 2\left(\frac{\sin(\theta)}{\cos(\theta)\cos(\phi)}\right)$$

Figure 27:
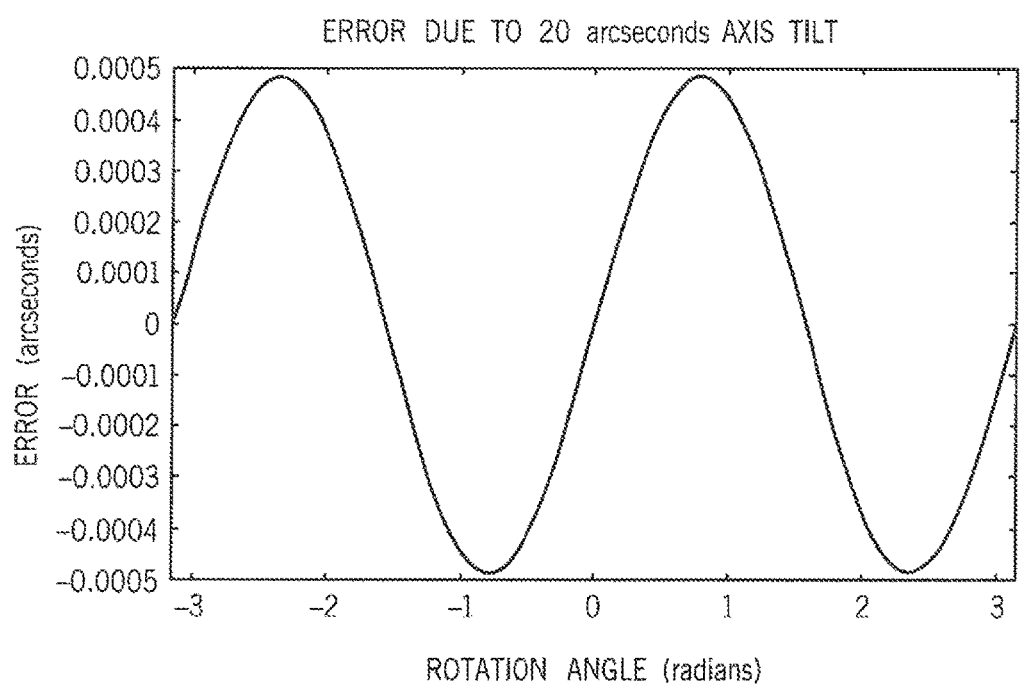
FIG. 27 shows the calculated error due to measuring an angle of rotation about a tilted axis.

Since $\phi$ is very small, $\cos(\phi)$ is nearly 1, so $\theta'$ is very nearly $\theta$. FIG. 27 shows a graph of the difference between the measured and actual values, $\theta'-\theta$, assuming an axis tilt $\phi$=20 arcseconds. From this we conclude that the error in the measurement directly due to measuring about an axis tilted by a small amount (20 arcseconds) will be very small (less than half of a milli-arcsecond). This error is two orders of magnitude less than the claimed accuracy of the device.

It is interesting to note that the error as a function of $\theta$ is very nearly a second harmonic sine function. As the tilt angle r increases, the error increases significantly and gradually differs more and more from a sinusoidal form.

Fourth, we consider the error introduced by axial shifts of the disks. Axial shifts of the encoder disks relative to the encoder modules can occur for several reasons. Specifically, axial runout of the main platform angular contact bearings will move the upper encoder modules axially relative to the disks. Differential thermal expansion between the aluminum structural components and shaft and steel bearings will also cause a small axial shift. Also, if the encoder disks are not precisely perpendicular to the axis of rotation, different sections of the disk will have different axial positions relative to the encoder modules as the disk rotates. Furthermore, these differences will vary as the main platform rotates, due to the axial runout of the main bearings and due to the tilt of the disk axis relative to the main bearing axis.

All of these sources should only produce very small axial shifts. Specifically the axial runout of the main bearing is less than 0.0001 inch, and it should be possible to keep the disks perpendicular to the axis of rotation to within less than 0.001 inch at the edge of the disks. Consequently, at first glance it would seem that these errors could be ignored.

Unfortunately, even such small axial shifts could matter. The optical axis of the encoder modules will not be exactly perpendicular to the base of the encoder modules. The collimator lens over the infrared LED in the encoder is just an inexpensive plastic lens. Furthermore, it seems likely that there could be some small errors on the order of 0.001 inch in the relative placement of the LED source and the reticle that covers the optical sensors in the encoder modules. The distance from the LED source to the sensor is about 0.1 inches. If we assume a slight tangential deviation of 0.001 inch between the vertical direction and the optical axis, an axial change of only 0.0001 inch would cause a tangential shift of $$0.001 \times \frac{0.0001}{0.1} = 10^{-6}$$

inch in the position where a mark was detected. Furthermore, this change would be systematic, not random. That is if the disk shifted upward by merely 0.0001 inch all marks detected by such an encoder module would shift laterally by a micro-inch, which effectively shifts the reference point for that disk by a micro-inch. A shift of a micro-inch at a radius of 1 inch represents an angular change of slightly more than 0.2 arc-seconds, which is double the claimed accuracy of the device.

The example implementations used several means to mitigate the effects of axial shifts. First, in the first sample implementation, the angle between the base of the encoder modules and the encoder module mounting plates was adjusted to make the optical axis of the encoder modules more nearly parallel to the axis of rotation of the disks. This will reduce the effect of any axial displacements. This was not done in the second example implementation, which may explain the residual first harmonic error in the second example implementation. Second, in both example implementations the axial motion of the disk axis is constrained by a single point contact thrust ball bearing that is preloaded against a planar thrust plate. This eliminates axial runout of the instrument bearings that support the rotating disk's shaft as a source of axial motion of the disks. Third, the short-term effect of differential thermal expansion is reduced by using thick section structural components with a long thermal time constant. Fourth, at least some of the thermal expansion of the rotating disks' shaft, 5, in the axial direction will be matched by expansion of the main platform bearings, 12, and the stainless steel standoffs, 22, shown in the exploded views of the device. Finally, to keep the encoder disks as nearly perpendicular to the axis of rotation as possible, the disks are epoxied onto oversized machined hubs that support the disks nearly to the point where they extend into the encoder modules.

Next, consider the effects of errors in the angular velocity of the rotating disks. If the two rotating disks rotated at precisely constant angular velocity, then Equation 23 would give the exact value of $\phi$ when $S_k(\phi)$ is measured using times as given by Equation 24. Furthermore, in the idealized case of constant angular velocity, the result would be correct for any sets of angles $\{A_i\}$ and $\{B_i\}$, with arbitrary non-uniform spacing. Unfortunately, in any actual physical embodiment of the concepts described herein, the angular velocity will not be precisely constant and the interaction of errors in the spacing of angles $\{A_i\}$ and $\{B_i\}$ with the angular velocity variations as the disks rotate will lead to measurement errors that will be different at different values of $\phi$.

Suppose that T is the total time required for the current complete revolution of the disks. The time required for the next complete revolution will, of course, be slightly different, but each measurement of the angle $\phi$ only uses data from one complete revolution. The average angular velocity for this revolution will just be:

$$\Omega = \frac{360°}{T} \tag{28}$$

Let the function $\omega(\ )$ give the actual angular velocity for this revolution as a function of time and let the function $e(\ )$ give the difference between the actual angular velocity and the average angular velocity $\Omega$. Then we have:

$$\omega(t)=\Omega+e(t) \text{ for } t\in[0,T] \tag{29}$$

Let $\alpha_i$ be the time to rotate through angle $A_i$ at constant angular velocity $\Omega$ and let $\hat{\alpha}_i = \alpha_i + \Delta\alpha_i$ be the time required to rotate through angle $A_i$ at the non-constant angular velocity $\omega(\ )$. The SDSAMS method would give exact results if we could actually measure time $\alpha_i$ but we can only measure $\hat{\alpha}_i$. The difference is $\Delta\alpha_i$ is the error in the $i^{th}$ time measurement on the first disk due to the non-constant angular velocity of the rotating disks. However, the corresponding angle $A_i$ is the same in either case. That is we have both $$A_i = \Omega\alpha_i = \int_0^{\alpha_i} \Omega dt$$

and $$A_i = \int_0^{\alpha_i + \Delta\alpha_i} \omega(t)dt = \int_0^{\hat{\alpha}_i} \omega(t)dt$$

Similarly, let $\tau_{i-k}$ be the time to rotate through angle $B_{i-k}+\phi$ at constant angular velocity $\Omega$ and let $\hat{\tau}_{i-k} + \Delta\tau_{i-k}$ be the time required to rotate through angle $B_{i-k}+\phi$ at the non-constant angular velocity $\omega(\ )$. As before, we would like to measure $\tau_{i-k}$, but we actually measure $\hat{\tau}_{i-k}$. Here $\Delta\tau_{i-k}$ is the error in the $i^{th}$ time measurement on the second disk due to the non-constant angular velocity of the rotating disks. In this case also we have both $$B_{i-k}+\phi = \Omega\tau_{i-k} = \int_0^{\tau_{i-k}} \Omega dt \tag{32}$$

and $$B_{i-k}+\phi = \int_0^{\tau_{i-k}+\Delta\tau_{i-k}} \omega(t)dt = \int_0^{\hat{\tau}_{i-k}} \omega(t)dt \tag{33}$$

Using these expressions for $A_i$ and $B_{i-k}+\phi$ we also get expressions for the $i^{th}$ term of the shifted delta sum $S_k(\phi)$ in terms of the average angular velocity $\Omega$ and in terms of the actual angular velocity function $\omega(\ )$. Specifically, we have both $$B_{i-k} + \phi - A_i = \int_0^{\tau_{i-k}} \Omega dt - \int_0^{\alpha_i} \Omega dt \tag{34}$$

$$= \int_{\alpha_1}^{\tau_{i-k}} \Omega dt \tag{35}$$

and $$B_{i-k} + \phi - A_i = \int_0^{\hat{\tau}_{i-k}} \omega(t)dt - \int_0^{\hat{\alpha}_i} \omega(t)dt \tag{36}$$

$$= \int_{\hat{\alpha}_i}^{\hat{\tau}_{i-k}} \omega(t)dt \tag{37}$$

Equating these expressions for the $i^{th}$ term of the sum gives:

$$\int_{\alpha_i}^{\tau_{i-k}} \Omega dt = \int_{\hat{\alpha}_i}^{\hat{\tau}_{i-k}} \omega(t)dt \tag{38}$$

$$= \int_{\hat{\alpha}_1}^{\hat{\tau}_{i-k}} \Omega + e(t)dt \tag{39}$$

$$= \int_{\hat{\alpha}_i}^{\alpha_i} \Omega dt + \int_{\alpha_i}^{\tau_{i-k}} \Omega dt + \int_{\tau_{i-k}}^{\hat{\tau}_{i-k}} \Omega dt + \tag{40}$$

$$= \int_{\hat{\alpha}_i}^{\hat{\tau}_{i-k}} e(t)dt$$

Cancelling the term that appears on both the left and right hand sides of this equation and simplifying, using the fact that $\Omega$ is a constant gives:

$$0 = \int_{\hat{\alpha}_i}^{\alpha_i} \Omega dt + \int_{\tau_{i-k}}^{\hat{\tau}_{i-k}} \Omega dt + \int_{\hat{\alpha}_i}^{\hat{\tau}_{i-k}} e(t)dt$$

$$= \int_{\alpha_i+\Delta\alpha_i}^{\alpha_i} \Omega dt + \int_{\tau_{i-k}}^{\tau_{i-k}+\Delta\tau_{i-k}} \Omega dt + \int_{\hat{\alpha}_i}^{\hat{\tau}_{i-k}} e(t)dt$$

$$= \Omega(\Delta\tau_{i-k} - \Delta\alpha_i) + \int_{\hat{\alpha}_i}^{\hat{\tau}_{i-k}} e(t)dt$$

From this we can find the error in the times measured for each term in the sum in equation 24 as:

$$(\hat{\tau}_{i-k} - \hat{\alpha}_i) - (\tau_{i-k} - \alpha_i) = \Delta\tau_{i-k} - \Delta\alpha_i$$

$$= \frac{\int_{\hat{\alpha}_i}^{\hat{\tau}_{i-k}} e(t)dt}{\Omega}$$

The total error in $S_k(\phi)$ from equation 24 will then be:

$$E(\phi) = -\sum_{i=0}^{N-1} \int_{\hat{\alpha}_1}^{\hat{\tau}_{i-k}} e(t)dt$$

Note that the endpoints of the integrals in Equation 46 are the actual times that are measured, not the theoretical times. As a result, we could use this equation for the error to make corrections to the measurements made with the device, if we could obtain good values for the angular velocity error function $e(\ )$.

This error equation immediately leads to two interesting observations. First, as expected, if the angular velocity is constant, then $e(t)=0$ so the total error due to speed variations would be zero. Second, suppose instead that the "marks" around the disks are perfectly uniformly spaced. If the angular velocity is reasonably constant say with variations on the order of 1%, as is the case for the example implementations then the intervals over which the integrals in Equation 46 are evaluated will all be of nearly equal length and will be quite uniformly spaced in the interval [0, T). Since we only use the angular velocity error function $e(\ )$ over the interval [0, T) we may consider it to be a periodic function with period T and represent it by a Fourier series. Due to the rotational inertia of the disks and motor armature and the limited driving torque available, we would expect the Fourier series of the angular velocity function to include only relatively low order harmonics. Also, since the function e( ) is the difference from the average angular velocity on the interval [0, T), the average value of e( ) (the "DC term") will be zero. Since the total error is the sum of a large number of integrals, over very small, nearly equal length intervals uniformly distributed over one period of the function e( ), we would expect the sum to be very nearly zero. That is, we expect that the basic uncorrected error should be very small if the marks around the disk are evenly spaced. Both reducing the angular velocity errors and improving the uniformity of the spacing of the marks around the disk should reduce the basic error in a measurement with a single pair of encoders.

These observations can be made more general and more precise. In any real system there will be errors in both the angular velocity and in the placement of marks around the disks. As will be shown, the interaction of these two types of errors as $\phi$ varies can explain the structure of the errors observed in the full circle tests.

In its present form, Equation 46 is somewhat difficult to interpret. Specifically, the dependence on the rotation angle $\phi$ is in the upper endpoint of the integrals. As $\phi$ varies, k will vary in steps, and even for small ranges where k stays unchanged, $\hat{\tau}_{i-k}$ will still vary with changing $\phi$. Also, the way the angular velocity error affects the total error is both through the integrand e( ) and through the endpoints of the integrals, since the times when marks pass reference points will also depend on the angular velocity error.

To get a better understanding of the nature of the total error function, $E(\phi)$, we will rewrite the integrals in terms of functions of angle, rather than as functions of time, This is possible, since times in the interval [0, T) are mapped one-to-one onto the interval of angles, [0, 360°) by the monotonically increasing function $$\theta(t) = \int_0^t \omega(t) dt$$

in fact, since the angular velocity function $\omega(t)$ is nearly constant, the function $\theta(t)$ is almost a simple multiple of t, Given that $\theta(t)$ is a nearly linear one-to-one differentiable function, it is safe to assume that it will have an inverse $t(\theta)$ that is also a nearly linear one-to-one differentiable function. Using this we can change the variable of integration in Equation 46 from t to $\theta$ and rewrite the total error expression as:

$$E(\phi) = -\sum_{i=0}^{N-1} \int_{A_i}^{B_{i-k}+\phi} e(t(\theta))t'(\theta) d\theta$$

Now, in Equation 48, the endpoints of the integrals depend only on the angles to marks on the disk and on the angle $\phi$. The integrand only depends on the angular velocity function (via its inverse and the derivative of its inverse) and its error as a function of the variable of integration $\theta$.

The total error function can be simplified further if we consider Equation 48 for an arbitrary but fixed rotation angle $\phi$. For any such fixed $\phi$, the shift, k, in the index on B will be chosen so that the mark at angle $B_{-k}$ is the first mark on the second disk to pass the reference point shifted by $\phi$ after the mark at angle $A_0$ passes the reference point on the first disk. With this convention and with marks on the disks quite evenly spaced, all of the integrals will be over small intervals of the disks' rotation angle $\theta$, from $\theta = A_i$ to $\theta = B_{i-k} + \phi$. For some of the intervals, it may be that the order of the end points is reversed since we could have $B_{i-k} + \phi < A_i$ for some i due to non-uniform spacing of the marks on the disk. However, that does not matter. In all cases the length of the interval of integration will be small.

If we apply the mean value theorem for integrals, to each of the integrals in Equation 48, we get that:

$$E(\phi) = -\sum_{i=0}^{N-1} (B_{i-k} + \phi - A_i) e(t(\psi_i)) t'(\psi_i)$$

where each $\psi_i$ a point between $A_i$ and $B_{i-k}+\phi$ at which the value of the integrand is the average value of the integrand over the interval of integration. Both the value of k and the mean value points $\{\psi_i\}$ may change when $\phi$ changes, but for any fixed $\phi$ the total error due to non-constant angular velocity will have the form given in Equation 49

The form of $E(\phi)$ given in Equation 49 is very informative, since the errors in the positions of marks on the disks have been separated from the angular velocity error.

We first consider the parts of Equation 49 that involve the angular velocity function. The mapping between angles and times is nearly linear. More specifically the function $$t(\theta) \approx T \cdot \theta / 360°.$$  (50)

and $t'(\theta)$ will be nearly equal to the small constant T/360°. Since the mean value points $\{\psi_i\}$ all lie in the small intervals of integration they will be nearly evenly spaced around the circle. Since they are mapped to the interval [0, T) by the nearly linear function $t(\theta)$, we see that $e(t(\psi_i))$ will be a list of values of the error function e(t) evaluated at nearly evenly spaced points spread across the full interval [0, T). Consequently, the part of Equation 49 that involves the angular velocity function, $e(t(\psi_i))t'(\psi_i)$, is nearly a constant multiple of a list of samples of the angular velocity error function evaluated an N nearly evenly spaced points. As a result, we expect that the factor $e(t(\psi_i))t'(\psi_i)$ will have an average value very near zero and will have only relatively low order harmonics, like the velocity error function e( ) itself. Also, as $\phi$ changes, although the mean value points $\{\psi_i\}$ will vary slightly, they will remain confined to small intervals around the corresponding angles $\{A_i\}$ which are nearly uniformly spaced around the circle. Hence, the angular velocity dependent part of $E(\phi)$ will remain nearly unchanged even as $\phi$ changes and will have essentially the same harmonic content as the angular velocity error function e( ) itself.

Next, consider the factor $(B_{i-k}+\phi-A_i)$. If the sets of angles $\{A_i\}$ and $\{B_i\}$ were precisely uniformly spaced around the circle, then for any fixed $\phi$ and corresponding k, this factor would be precisely constant independent of the index i. Now suppose that $\{A_i\}$ is the actual set of angles of the nearly uniformly distributed marks around Disk 1. In this case, the list of values $\{A_i\}$ for i=0, 1, 2, ..., N−1 are the values of a nearly a linear function of the index, i, with values nearly equal to $$\frac{360°}{N} i.$$

The deviations of these values from the perfectly linear function $$\frac{360°}{N} i$$

is due precisely to the deviations of the spacings of the marks from perfect uniformity on Disk 1. Similarly, the list of values ($B_{i-k}+\phi$) for i=0, 1, 2, . . . . N−1 are the values of a nearly linear function of the index, i, with values also nearly equal $$\frac{360°}{N} i.$$

It is necessary to subtract 360° from the terms $B_{i-k}+\phi$ for which the term exceeds 360° to get the correct value for the difference angle ($B_{i-k}+\phi-A_i$). Also, as before, the calculation of the subscript i−k is done mod N. The non-constant deviations of these values from the perfectly linear function $$\frac{360°}{N} i$$

are due precisely to the deviations of the spacing of the marks from perfect uniformity on Disk 2. Therefore, the values $\{(B_{i-k}+\phi-A_i)\}$ for i=0, 1, 2, . . . , N−1 will be small, with deviations from zero coming from two sources. First, there will be a constant offset due to the current fixed value of $\phi$. Second, any non-constant deviations from zero will come directly from the non-uniformity of spacing of the marks on Disk 1 and Disk 2!

To see how the parts of Equation 49 interact, for any arbitrary but fixed $\phi$ and corresponding k, we group the factors into two functions of i:

$$f(i)=B_{i-k}+\phi-A_i \text{ for } i=0,1,2,\ldots,N-1 \qquad (51)$$

and $$g(i)=e(t(\psi_i))t'(\psi_i) \text{ for } i=0,1,2,\ldots N-1 \qquad (52)$$

For any such fixed $\phi$ and corresponding k we see that the error function is the inner product of $f$ and g. That is:

$$E(\phi) = -\sum_{i=0}^{N-1} f(i)g(i) \qquad (53)$$

$$= \langle f \cdot g \rangle \qquad (54)$$

If we let j be the imaginary unit then the N complex exponential functions $$u_k(i) = e^{\frac{2\pi j}{N} ki} \text{ for } i = 0, 1, 2, \ldots, N-1 \qquad (55)$$

for k=0, 1, 2, . . . , N−1 form an orthogonal basis of N dimensional complex space relative to this inner product. The Discrete Fourier Transform of a list of N values will produce a representation of that list of values as a sum of multiples of these basis functions. Consider the representations of the functions $f(\ )$ and $g(\ )$ relative to these basis functions. That is, consider the discrete Fourier transform of these two functions.

The function $g(\ )$ will have an average value that is essentially zero and its discrete Fourier Transform will have only low order terms due to the rotational inertia of the rotating disk assembly. In particular, since the first example implementation uses a three phase brushless motor with six pole pairs and the driving circuit steps through six states to advance the armature rotation by one pole pair, we would anticipate the strongest rotational error harmonics to occur up to the $36^{th}$ harmonic. Since the second example implementation uses five pole pairs, we would expect slightly lower error harmonics, though perhaps with larger amplitudes. In both cases we expect the zero order term to be very nearly zero, since the average value is essentially zero. These observations about the function $g(\ )$ should hold for all values of $\phi$ and k.

The function $f$ will be different for different values of $\phi$ and k. In particular $f$ essentially gives the difference of the errors in the placement of marks on Disk 1 and Disk 2, relative to perfectly uniformly spaced marks for different phase shifts of Disk 2 relative to Disk 1. To see this, express the terms of the sequences $\{A_i\}$ and $\{B_{i-k}+\phi\}$ as a sums of the linear function $$\frac{360°}{N} i.$$

plus an error function:

$$A_i = \frac{360°}{N} i + \delta_A(i) \qquad (56)$$

$$B_{i-k} + \phi = \frac{360°}{N} i + \delta_{B\phi k}(i) \qquad (57)$$

The function $f(\ )$ is the difference of these and consequently the common linear part, $$\frac{360°}{N} i,$$

cancels in the difference. The error function for the A angles is independent of $\phi$. The $i^{th}$ value of the error function $\delta_A(\ )$ just gives the error in the angle to the $i^{th}$ mark on Disk 1 relative to evenly spaced marks at $$\frac{360°}{N} i, i = 0, 1, 2, \ldots, N-1.$$

The error function for the B angles clearly depends on $\phi$. Different values of $\phi$ will lead to different values of k, which produces a phase shift of the B angles relative to the A angles. That is, for a fixed $\phi$ and corresponding k, the $i^{th}$ value of the second error function $\delta_{E\phi k}(\ )$ will give the error in the angle to the $(i-k)^{th}$ mark on Disk 2 relative to evenly spaced marks at $$\frac{360°}{N} i - \phi \ i = 0, 1, 2, \ldots, N-1.$$

Since during manufacture, the marks are placed very accurately on the disks by optical projection of larger master images, we anticipate that the inherent errors in the mark positions will be generally quite small. However, one major source of errors in the effective mark positions when the disk is actually in use is the inaccuracy of the disk mounting. First, it is impossible to perfectly center the disk on the rotating shaft, which introduces eccentricity error in the effective mark positions. Consequently, we expect the mark placement error functions to have a fairly large systematic "once around" error. Also, as discussed in the in regard to Disk Axis Errors, we anticipate that there should be some effective distortion of the disk from a perfect circle to an elliptical shape due to the disk not being mounted exactly perpendicular to the axis of rotation. There could be other sources for an elliptical distortion of the disk such as a slight tilt of either the disk image or of the disk medium when the mark pattern is optically projected onto the disk medium. In any case, we expect some second harmonic content in the disks' mark placement error functions due to such elliptical distortion. We expect most other mark placement errors to be restricted to much higher harmonics.

Now, consider replacing the functions $f(\ )$ and $g(\ )$ in Equation 53 by their Fourier representations as sums of multiples of the basis functions $u_k$. If we use all N components of the discrete Fourier transform of $f(\ )$ and $g(\ )$, these representations will be exactly equal to the functions at all N sample points. Since the basis functions are orthogonal, the only terms that will contribute to the sum will be from harmonics that are present in both $f(\ )$ and $g(\ )$. We expect the representation of $f(\ )$ to include relatively large multiples of $u_0(\ )$, $u_1(\ )$, and $u_2(\ )$ followed by many essentially zero components before reaching more non-zero components in the high harmonics. We expect the representation of $g(\ )$ to only have non-zero components for $u_1(\ )$, $u_2(\ )$, $u_3(\ )$, ..., $u_{36}(\ )$, with perhaps a few higher harmonics at lower amplitudes. Due to the orthogonality of the basis functions we therefore expect the largest contributions to the error sum in Equation 53 to come only from the components of $u_1(\ )$ and $u_2(\ )$ which are the terms that the Fourier representations of $f(\ )$ and $g(\ )$ have in common. Overall, for a fixed $\phi$ and corresponding k, the error $E(\phi)$ will basically come from the interaction of the fundamental and second harmonics of the disk mark error functions with the angular velocity errors of the rotating disks.

What does this imply about the behavior of the error function $E(\phi)$ as the measurement angle $\phi$ changes? As mentioned earlier, as $\phi$ and the corresponding k change, the function $g(\ )$ should remain relatively unchanged. However, as $\phi$ changes, the phase of the error function $\delta_{\beta\phi k}(\ )$ will change relative to the phase of the error function $\delta_A(\ )$. The difference of two sinusoidal functions of the same frequency produces another sinusoidal function of that frequency for any phase relationship. Therefore, the non-zero terms of the Fourier representation of $f(\ )$ will come from the corresponding Fourier terms of the disk error functions. However, the magnitude of the harmonics in $f(\ )$ as a function of $\theta$ will change as $\phi$ changes since different values of $\phi$ will lead to different shifts k. Consider the "once around" errors in the effective mark placements on Disk 1 and Disk 2. For some $\phi$ the error function will shift so that the difference of the errors on Disk 1 and Disk 2 will combine constructively leading to the largest amplitude of the fundamental in the function $f(\ )$ for that $\phi$. If $\phi$ is changed by 180° the "once around" errors will then combine destructively, leading to the smallest amplitude of the fundamental in the function $f(\ )$ for that $\phi$. As $\phi$ varies around the full circle, the amplitude of the fundamental term in the function $f(\ )$ will go through one complete cycle varying between a maximum and minimum amplitude, sinusoidally. That is, there will be a fundamental, once around variation in the total error function $E(\phi)$ as a function of $\phi$ due to different phase shifts between the once around errors in the mark placements on Disk 1 and on Disk 2, which are ultimately functions of the disk rotation angle $\theta$. Similarly, the amount of second harmonic in the function $f(\ )$ will vary if $\phi$ changes. For the second harmonic, there would be two values of $\phi$ where the second harmonic error in Disk 1's mark positions combines constructively with the second harmonic error in Disk 2's mark positions, and two positions where they combine destructively. This will produce a second harmonic variation in the total error function $E(\phi)$. More generally, the magnitude of the $N^{th}$ order harmonic in function $f(\theta)$ will vary with changing $\phi$ to produce an $N^{th}$ order harmonic in the total error $E(\ )$ as a function of $\phi$. This explains the structure of the measurement error of the first example implementation as seen in FIGS. 17 and 18.

Figure 28:
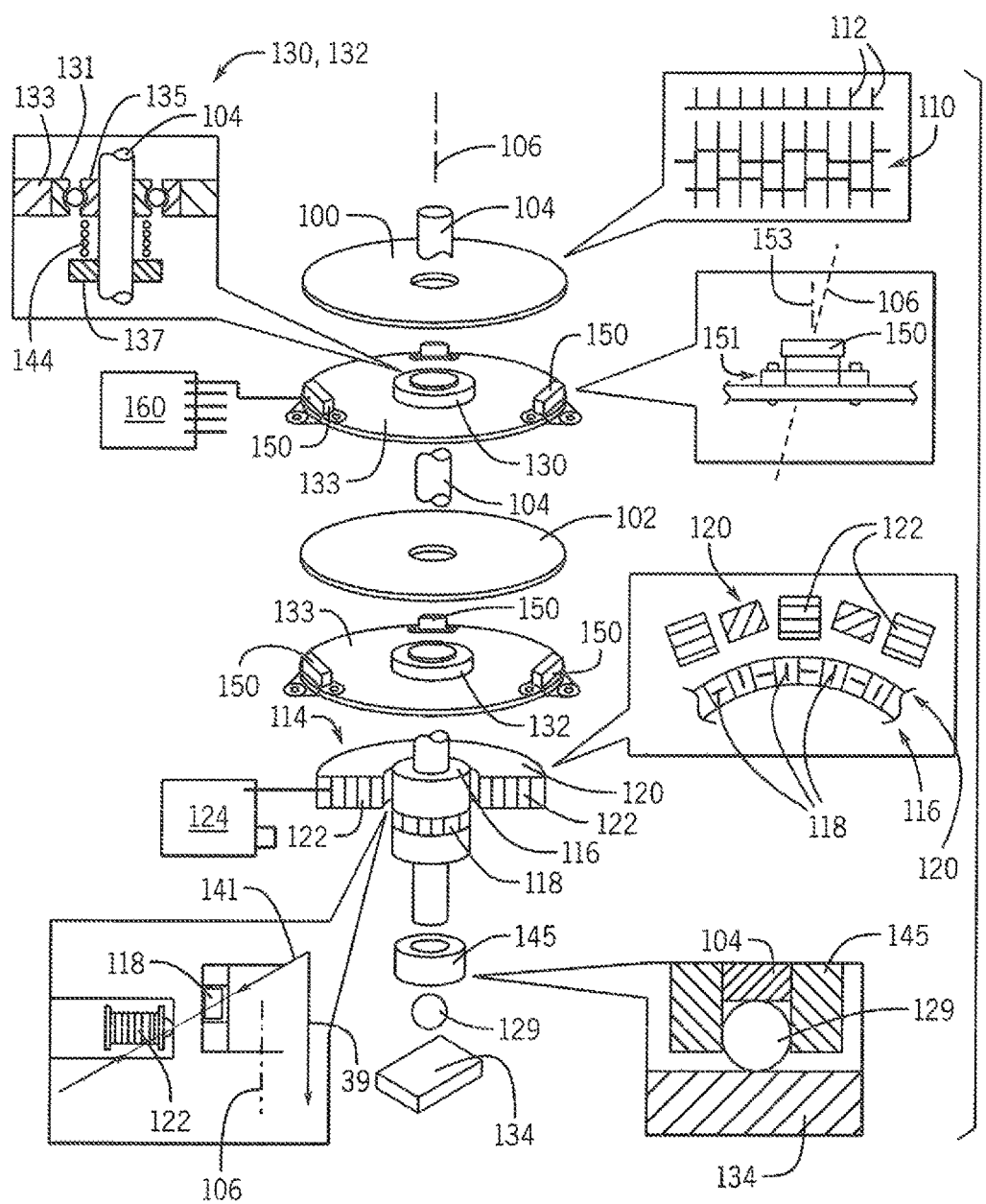
FIG. 28 shows a block diagram incorporating features of the previous figures.

Referring now to FIG. 28, in one embodiment, optical encoder disks 100 and 102 may be mounted on a common shaft 104 (shown in fragment for clarity) to extend radially therefrom away from a central axle axis 106 and to rotate therewith in unison. Each of the disks 101 and 102 may be quadrature encoded at 2500 lines per revolution provided by quadrature encoding tracks 110 that may be decoded to a high-resolution angle signal 112 providing 10,000 transitions per revolution. The high-resolution angle signal 112 is obtained by providing a timing mark at every quadrature transition of track 110.

The optical encoder disks 100 may be rotated in unison by a DC permanent magnet motor 114 constructed of an aluminum rotor 116, as described above, having an equatorial band of 24, 3/16 inch cube neodymium magnets 118 epoxied within a channel to provide six north-south pole pairs arranged in a Halbach array to concentrate flux outwardly from the axis 106. A stator 120 is produced of 18 ferrite core inductors 122 equally spaced in opposition to the aluminum rotor 116 to provide a motor having extremely low harmonic velocity components. These ferrite core inductors 122 may be embedded in a matrix of Kevlar filled nylon having a coefficient of expansion substantially equal to the aluminum of the rotor 116 and other components of the device. The motor may be driven by a DC motor driver 124 in open loop constant velocity configuration. The ferrite core inductors 122 may be hand selected to improve their matching and thereby reduce motor speed harmonics caused by asymmetrical stator magnet strength.

The shaft 104 may be guided by precision (ABEC-7 or better) radial ball bearings 130 and 132 at an upper and lower end of the shaft 104. An outer race 131 of each of the ball bearings 130 and 132 may be glued to an optics support disk 133 and the inner race 135 may be slightly lubricated to allow axial movement of the shaft 104 with respect to the inner race 135. Offset collars 137 may be attached to the shaft 104 in the vicinity of the bearing 130 and 132 and a compression spring such as a helical compression spring 144 may be attached between the collars and the inner races 135 to provide slight axial preloading in opposite directions of the inner races 135 of the bearings 130 and 132 such as eliminates radial play.

A resistance to axial movement of the shaft 104 is provided by a secondary thrust bearings formed from a silicon carbide ball 129 positioned within a press fit aluminum collar 145 having a nominal inner diameter equal to that of the shaft 104 and the ball 129 to center the ball 129 along the axis 106. A lower surface of the ball 129 rests against a substantially flat titanium nitride coated carbide tooling insert 134 having an upper face perpendicular to axis 106. A slight preload along the axis 106 may be provided, for example, by the bearing formed by the ball 129 and the tooling insert 134 working against a magnetic attraction vector 141 between the rotating magnetic field provided by the activated inductors 122 and the magnets 118, the vector 141 having a downward component 139 along the axis 106 toward the ball 129. The bearing formed by the ball 103 and the tooling insert 142 provides initially no resistance to the radial location of the axis 106 being defined precisely by the bearings 131, 132, Three optical encoders 150*a* for upper disk 100 and three optical encoders 150*b* for lower disk 102 are supported on respective optics support disks 133 also supporting bearings 130 and 132 as described. Each optics support disk 133 may, for example, be adjustable by shimming to be perfectly perpendicular to axis 106. One of the optics support disks 133 may move angularly with respect to each other about axis 106, as described above. The supported optical encoders 150 are shimmed with shims 151 under one of two circumferentially displaced mounting points so that an optical axis 153 defined as the central path of light between the light emitter and light receiver of the optical encoder 150 is precisely parallel to axis 106. This minimizes angular error caused by slight axial displacement of the encoder disks 100 and 102.

Each optical encoder 150 are attached to a computing system 160 performing the calculations described above, for example, using multiple processing cores to provide extremely fast processing speeds. Each of the optical encoders is separated from the others by an equal angle of 120 degrees. Multiple encoders help cancel certain sinusoidal components of the error function due to motor speed errors and disk mark errors as discussed above.

Ideally, the number of motor poles and the number of encoders will be selected to minimize errors caused by motor velocity error harmonics aligning with harmonics in the encoder positions error function. For example a five pole motor with three encoder positions will not have such alignment for lower two harmonics.

The computing system 100 may include a calibration curve to correct residual system error from sources such as main bearing axial runout. This calibration will typically only be needed for extremely high precision and will employ a determination of absolute disk location 100 for example using a timing mark of a type well known in the art.

Generally, it will be appreciated that the measurements made by the processor must compare the timing between corresponding marks despite the fact that the encoder disk is an incremental rather than absolute encoder disk. This comparison process can be implemented by knowing the number of marks on the disk and counting passing marks until a corresponding mark arrives.

To summarize, the most significant part of the overall error that is due to time measurement errors is small and random. If need be, multiple readings can be averaged to reduce the effect of these timing uncertainties.

Systematic errors that are directly due to main bearing errors are minimal for measurements made at "at infinity". Main bearing radial runout will lead to a small variable tilt of the rotating axis relative to the main bearing axis.

The error directly due to measuring rotations about an axis that is slightly tilted relative to the actual axis of rotation is very small, less than a milli-arcsecond. However such tilts, along with main bearing runout and errors in mounting the disks perpendicular to the rotating shaft, distort the effective shape to the disk to be elliptical rather than a perfect circle. This distortion will contribute to the second harmonic error in the effective mark positions on the disks.

The fundamental and second harmonic errors in the effective locations of marks around the rotating disks interact with errors in the angular velocity to create much of the full circle measurement error observed in the first example implementation. The fundamental "once around" error is nearly eliminated by the use of two pairs of encoders, separated by 180°. The second harmonic errors can either be corrected in the device's software using a calibration curve or can be reduced by using data from three or four equally spaced encoders on the rotating platform.

It should be noted that structural elements of the motor, such as the number of motor poles, together with errors in the positions of marks on the disk(s) determine the harmonic content of the part of the main measurement error function due to measuring times instead of the angles directly. The number and position of the sensors employed can be chosen to zero out many of the harmonics in this measurement error function. Many different effective designs are possible by varying the number and position of the sensors and the structure of the motor. These design choices can be made to balance considerations such as measurement noise, residual measurement error, power dissipation, device size and cost.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

I claim:

1. A device for measuring angles comprising:
   a first and second rotor each having a plurality of sensing marks arranged circumferentially around a common axis of the rotors;
   a motor for rotating the first and second rotors in unison at a substantially constant angular speed about the axis;
   sensors associated with each rotor to sense the marks as they pass the sensors with rotation of the rotors to generate sensor signals in response to sensing the marks, wherein a first set and second set of sensors are mounted on different platforms that may rotate relative to each other about the axis;
   at least two ball bearings supporting the shaft against radial motion, wherein the ball bearings include an axial preload between inner and outer races of the ball bearings; and
   a processor configured to receive the sensor signals and to measure an angle of rotation between one or more movable sensors and one or more fixed sensors based on the sensor signals;
   wherein the first and second rotors are on a common shaft supported at one end at a pivot point aligned along the axis;

wherein the pivot point is a ball in contact with an end of the shaft at a point;

wherein the ball bearings have their outer race attached to respective first and second supports holding the first and second set of sensors respectively; and wherein the sensors are optical sensors having light axes substantially aligned with the common axis and wherein the first and second supports provide an adjustable connection between the sensors and the respective support to adjust an angle of the optical axis with respect to the support.

2. The device for measuring angles of claim 1 wherein the ball has a hardness of greater than nine on the Mohs scale.

3. The device for measuring angles of claim 1 wherein the shaft is axially preloaded by an axial force between a stator and rotor of the motor against the pivot point.

4. The device for measuring angles of claim 1 wherein the first and second rotors provide sensing marks providing a quadrature signal that is decoded to timing marks at every quadrature transition.

5. The device for measuring angles of claim 1 wherein the processor is configured to measure a difference in time required for marks on the rotating disks to pass by corresponding sensors of the first and second sets.

6. The device for measuring angles of claim 1 wherein the processor is configured to calculate an angle of rotation between the movable sensors and the fixed sensors based on the differences in time relative to time required for one or more complete rotations of the rotating disks.

7. The device for measuring angles of claim 1 wherein the processor includes multiple computation units operating in parallel to increase a rate at which measurements are produced.

8. A device for measuring angles comprising:

a first and second rotor each having a plurality of sensing marks arranged circumferentially around a common axis of the rotors;

a motor for rotating the first and second rotors in unison at a substantially constant angular speed about the axis;

sensors associated with each rotor to sense the marks as they pass the sensors with rotation of the rotors to generate sensor signals in response to sensing the marks, wherein a first set and second set of sensors are mounted on different platforms that may rotate relative to each other about the axis; and a processor configured to receive the sensor signals and to measure an angle of rotation between one or more movable sensors and one or more fixed sensors based on the sensor signals;

wherein the first and second rotors are on a common shaft supported at one end at a pivot point aligned along the axis;

wherein the set of sensors includes at least three sensors for each of the first and second rotors spaced substantially equally about the axis.

9. A device for measuring angles comprising:

a first and second rotor each having a plurality of sensing marks arranged circumferentially around a common axis of the rotors;

a motor for rotating the first and second rotors in unison at a substantially constant angular speed about the axis;

sensors associated with each rotor to sense the marks as they pass the sensors with rotation of the rotors to generate sensor signals in response to sensing the marks, wherein a first set and second set of sensors are mounted on different platforms that may rotate relative to each other about the axis;

a brushless DC motor providing a rotor with at least five magnetic poles where the number of polls is not a multiple of the number of encoders; and a processor configured to receive the sensor signals and to measure an angle of rotation between one or more movable sensors and one or more fixed sensors based on the sensor signals;

wherein the first and second rotors are on a common shaft supported at one end at a pivot point aligned along the axis; and wherein the pivot point is a ball in contact with an end of the shaft at a point.

10. The device for measuring angles of claim 9 wherein the brushless DC motor is operated in open loop constant velocity.

11. A device for measuring angles comprising:

a first and second rotor each having a plurality of sensing marks arranged circumferentially around a common axis of the rotors;

a motor for rotating the first and second rotors in unison at a substantially constant angular speed about the axis;

sensors associated with each rotor to sense the marks as they pass the sensors with rotation of the rotors to generate sensor signals in response to sensing the marks, wherein a first set and second set of sensors are mounted on different platforms that may rotate relative to each other about the axis; and a processor configured to receive the sensor signals and to measure an angle of rotation between one or more movable sensors and one or more fixed sensors based on the sensor signals;

wherein the first and second rotors are on a common shaft supported at one end at a pivot point aligned along the axis;

wherein the processor is configured to measure a difference in time required for marks on the rotating disks to pass by corresponding sensors of the first and second sets;

wherein the processor includes a calibration curve correcting for variations in separation between the sensing marks on the optical disks.

12. A method for measuring angles using an angle measuring apparatus having a first and second rotor each having a plurality of sensing marks arranged circumferentially around a common axis of the rotors;

a motor for rotating the first and second rotors in unison at a substantially constant angular speed about the axis;

sensors associated with each rotor to sense the marks as they pass the sensors with rotation of the rotors to generate sensor signals in response to sensing the marks, wherein; a first set and second set of sensors are mounted on different platforms that may rotate relative to each other about the axis;

at least two ball bearings supporting the shaft against radial motion, wherein the ball bearings include an axial preload between inner and outer races of the ball bearings; and a processor configured to receive the sensor signals and to measure an angle of rotation between one or more movable sensors and one or more fixed sensors based on the sensor signals;

wherein the first and second rotors are on a common shaft supported at one end at a pivot point aligned along the axis, wherein the pivot point is a ball in contact with an end of the shaft at a point, wherein the ball bearings have their outer race attached to respective first and second supports holding the first and second set of sensors respectively, wherein the sensors are optical sensors having light axes substantially aligned with the common axis and wherein the first and second supports provide an adjustable connection between the sensors and the respective support to adjust an angle of the optical axis with respect to the support; wherein the method comprises the steps of:

(a) operating the processor to measure a time when marks pass the sensors;

(b) measuring a change in time between a mark on the first rotor passing a sensor of the first set of sensors and a corresponding mark on the second rotor passing a sensor on the second set of sensors; and (c) using the change in time to deduce angular displacement between the first and second sets of sensors.

* * * * *